(12) United States Patent
Monari et al.

(10) Patent No.: US 9,889,344 B1
(45) Date of Patent: Feb. 13, 2018

(54) INSTRUMENTED SPORTS PARAPHERNALIA SYSTEM

(71) Applicants: Lawrence Maxwell Monari, Palm Bay, FL (US); Lawrence Scott Monari, Palm Bay, FL (US)

(72) Inventors: Lawrence Maxwell Monari, Palm Bay, FL (US); Lawrence Scott Monari, Palm Bay, FL (US)

( * ) Notice: Subject to any disclaimer, the term of this patent is extended or adjusted under 35 U.S.C. 154(b) by 0 days.

(21) Appl. No.: 15/595,654

(22) Filed: May 15, 2017

Related U.S. Application Data

(62) Division of application No. 14/881,271, filed on Oct. 13, 2015, now Pat. No. 9,694,248.

(51) Int. Cl.
*A63B 43/00* (2006.01)

(52) U.S. Cl.
CPC .......... *A63B 43/004* (2013.01); *A63B 43/002* (2013.01)

(58) Field of Classification Search
CPC .............. A63B 43/004; A63B 43/002; A63B 2243/007; A63B 47/008; A63B 2225/50; A63B 2225/54; G01L 17/00; G01L 17/005; G01N 2203/0076
USPC .............................................. 73/700–756, 81
See application file for complete search history.

(56) References Cited

U.S. PATENT DOCUMENTS

| | | | | |
|---|---|---|---|---|
| 1,819,232 A * | 8/1931 | Cropper | ................ | G01M 99/00 73/790 |
| 5,511,410 A * | 4/1996 | Sherts | ...................... | G01N 3/14 73/81 |
| 5,567,870 A * | 10/1996 | Harris | ...................... | G01N 3/42 73/81 |
| 6,357,282 B1 * | 3/2002 | Benjamin | ............ | A63B 47/008 73/81 |
| 8,758,172 B2 * | 6/2014 | Creguer | ............ | A63B 71/0622 473/422 |
| 9,310,283 B2 * | 4/2016 | Niemeyer, III | ....... | A63B 47/008 |
| 2015/0107338 A1 * | 4/2015 | Billett | ................... | G01L 17/005 73/31.04 |
| 2016/0030815 A1 * | 2/2016 | Sprague | ............... | A63B 47/008 73/12.02 |

\* cited by examiner

*Primary Examiner* — Joshua T Kennedy

(57) ABSTRACT

A system for measuring and displaying the pressure of conventional American-style footballs in real time to game officials and spectators continuously. The value of the football's pressure is measured by physical contact with a Durometer and calculated using a CPU configured with software. Game officials may view the football's pressure locally. A transceiver device continuously transmits the value of the football's pressure, ID, time and date to remote receivers where game officials and spectators may continuously monitor the football's pressure remotely.

6 Claims, 17 Drawing Sheets

SECTION A-A

SECTION A-A

SECTION A-A

SECTION A-A

SECTION A-A

SECTION A-A

INSTRUMENTED SPORTS PARAPHERNALIA SYSTEM

CROSS REFERENCE TO RELATED APPLICATIONS

This is a division application Ser. No. 14/881,271, Filed Oct. 13, 2015, the entire content of which is hereby incorporated herein by reference.

BRIEF SUMMARY OF THE INVENTION

The invention is a real-time system used to measure, display and transmit the pressure of American-style footballs. The system permits pressure to be measured on and off the sidelines. In one preferred embodiment, the footballs are implanted with battery-less pressure transducer devices. The pressure transducer devices have low mass and are wirelessly driven by pressure readout devices that are external to the footballs. The pressure readout devices transmit the football pressure to remote sites where the pressures can be monitored continuously by the game officials and by the spectators. In another preferred embodiment, the football pressure is measured directly by physical contact with a Durometer. The Durometer pressure measurements are viewed locally and transmitted to remote sites where the pressure can be monitored continuously by game officials and by the spectators.

BACKGROUND OF THE INVENTION

1. Field of the Invention

The present invention relates generally to the field of sports entertainment, and in particular to the monitoring of football pressure by game officials and spectators.

2. Description of the Prior Art

In 2015 the New England Patriots won the AFC Championship and headed to the Super Bowl. A controversy arose when some of the 12 American-style footballs that the Patriots used were judged to be 2 psi below the league's pressure requirement on game balls. There clearly exists a need for the pressures of footballs to be monitored before and during games by one or more game officials. Furthermore, in order to dispel any perceived favoritism by the officials for one team over the other, and to restore confidence in the administration of the game, it would be useful for the game's spectators to be able to simultaneously monitor the football pressures as well, both before and during the games. It would be useful for the football pressures to be monitored by a system enabling both game officials and spectators alike to monitor the football pressure while the footballs are on the sidelines waiting to go into play. In order to enable the system to monitor the pressure of more than one football at a time, it would be useful for the system to be scalable. In order for the pressure of more than one football to be monitored simultaneously by both game officials and spectators alike, it would be useful for the system to enable the game officials and spectators to monitor the football pressures remotely.

Examples of the prior art are: U.S. Pat. No. 9,084,076 (Breed), U.S. Pat. No. 9,082,418 (Ong), U.S. Pat. No. 9,080,983 (Galliher), U.S. Pat. No. 9,089,740 (Frank), U.S. Pat. No. 9,066,558 (Molyneux), U.S. Pat. No. 8,870,690 (Krysiak), U.S. Pat. No. 8,758,172 (Creguer), and U.S. patent application Ser. No. 15/018,2810 (Thurman), Ser. No. 15/015,7900 (Holthouse), Ser. No. 15/012,6313 (HUSSAIN), Ser. No. 15/005,7775 (Dong), Ser. No. 15/015,0459 (Werahera), Ser. No. 15/014,8141 (Thompson), Ser. No. 14/033,2160 (Berggren), Ser. No. 14/022,1137 (Krysiak), Ser. No. 14/017,9469 (Berggren), Ser. No. 14/002,4483 (Bevier), In the prior art, the football pressure is measured with an air pressure gauge. The stem of the air pressure gauge is poked into the football's air valve. Operating the football's air valve can inadvertently cause pressurized air to be lost during this measurement process, thereby reducing the football's pressure. Therefore it would be useful to measure the football's pressure using a system that did not use the football's air valve. In addition, it would be useful for the system to provide some measure of redundancy or backup in the event that some part of the system fails.

SPECIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BRIEF DESCRIPTION OF THE SEVERAL VIEWS OF THE DRAWINGS

In order to more fully understand the objects of the invention, the following detailed description of the illustrative embodiments should be read in conjunction with the appended figure drawings, wherein.

DETAILED DESCRIPTION OF THE INVENTION

Figure 1A:
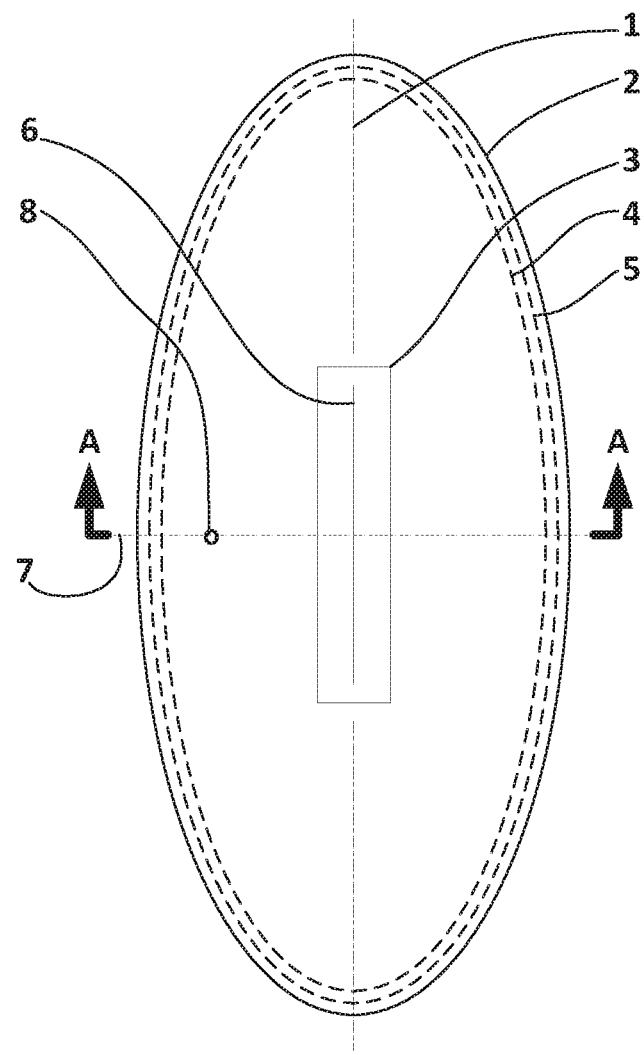
FIG. 1A shows a top view of a conventional American-style football.

Disclaimers:

The present invention will now be described in terms of specific example embodiments. It is to be understood that the invention is not limited to the example embodiments disclosed. It should also be understood that not every feature of the methods and systems handling the described device is necessary to implement the invention as claimed in any particular one of the appended claims. Various elements and features of devices are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

DETAILED DESCRIPTION OF THE DRAWINGS

Figure 1B:
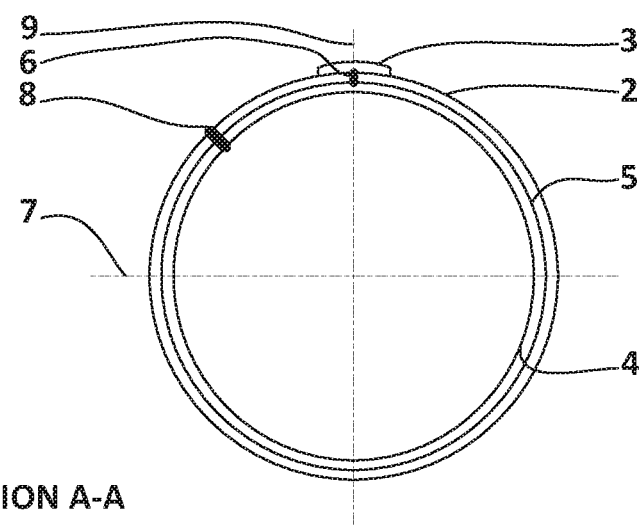
FIG. 1B shows a center section view of a conventional American-style football.

FIG. 1A and FIG. 1B

FIG. 1A shows a top view of a conventional American-style football.

FIG. 1B shows a center section view of a conventional American-style football.

The detailed physical elements disclosed in the drawing shown in FIG. 1A and FIG. 1B are identified as follows:

1 is the long z-axis of the football.

2 is the outer surface of the conventional cover-liner of the conventional football.

3 are the laces of the conventional football.

4 is the inside surface of the conventional football bladder.

5 is the interface space between the outside surface of the football bladder and the inside surface 4 of the football cover-liner.

6 is the slot opening through the football cover-liner. The bladder is loaded into the football cover-liner through this slot in the cover-liner panels.

7 is the x-axis of the football.

8 is the air valve of the football bladder.

9 is the y-axis of the football.

FIG. 1A and FIG. 1B are shown as reference drawings for the conventional football. The elements of FIG. 1A and FIG. 1B are referred to in FIG. 2 through FIG. 15.

FIG. 2A and FIG. 2B, FIG. 3A and FIG. 3B, FIG. 4A and FIG. 4B, FIG. 5A and FIG. 5B, FIG. 6A and FIG. 6B, FIG. 7A and FIG. 7B, FIG. 9A and FIG. 9B show preferred embodiments for footballs implanted with one, two, three, four, six, two, five pressure transducer devices respectively.

Figure 2A:
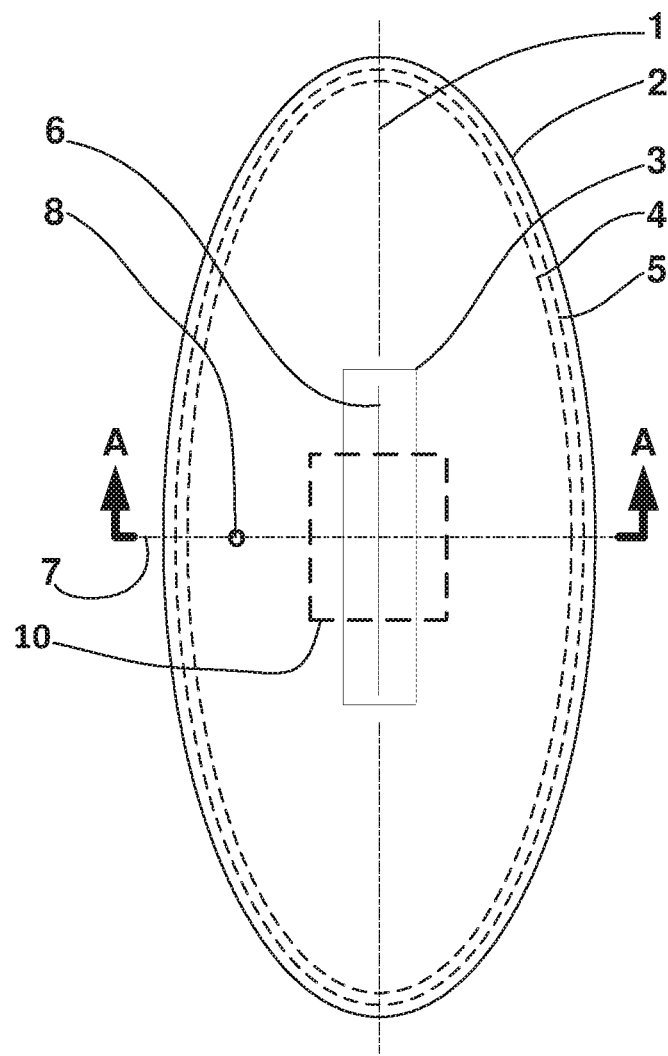
FIG. 2A shows a top view of a football equipped (instrumented) with one pressure transducer device.
Figure 2B:
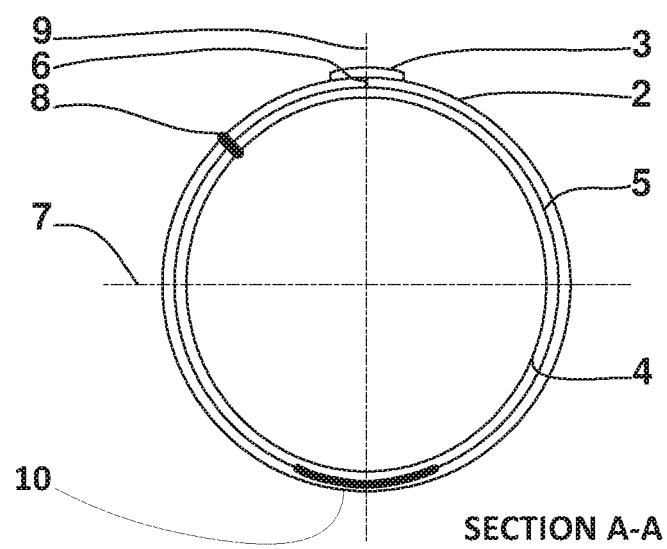
FIG. 2B shows a center section view of a football equipped (instrumented) with one pressure transducer device.

FIG. 2A and FIG. 2B

FIG. 2A shows a top view of a conventional football implanted (equipped) (instrumented) with one pressure transducer device.

FIG. 2B shows a center section view of the conventional football implanted (equipped) (instrumented) with one pressure transducer device.

The detailed physical elements disclosed in the drawing shown in FIG. 2A and FIG. 2B are identified as follows:

1 is the y-axis of the football.

2 is the outer surface of the conventional cover-liner of the football.

3 are the conventional laces of the football.

4 is the inside surface of the football bladder.

5 is the space (interface) between the outside surface of the football bladder and the inside surface of the football cover-liner.

6 is the slot opening through the football cover-liner.

7 is the x-axis of the football.

8 is the air valve of the football bladder.

9 is the z-axis of the football.

10 is a pressure transducer device situated in the space (interface) 5 between the outside surface of the football bladder and the inside surface of the football cover-liner. 10 is in the form of a smooth thin sheet of finite thickness having liner material attached on its surface facing the bladder. The surface of 10 conforms to the shape of surface 5 as shown. The purpose of the liner is to protect the bladder surface from wear and damage.

10 is symmetrically located about 9 in order to balance its moment of inertia around 9.

10 is located directly opposite 3 in order to contribute mildly toward balancing 3 about 7. The mass of 10 is very much smaller than the mass of 3.

Refer to FIG. 1A and FIG. 1B which show the elements of the conventional football.

FIG. 2A and FIG. 2B represent a preferred embodiment of the present invention equipped with one pressure transducer device for measuring the football pressure.

In order to read the football's pressure from the pressure transducer device implanted inside the football, a pressure readout device is required. The pressure readout device is external to the football and is wirelessly coupled to the pressure transducer device.

See FIG. 8, FIG. 10A and FIG. 10B, FIG. 11, and FIG. 14 for examples of pressure readout devices.

Figure 3A:
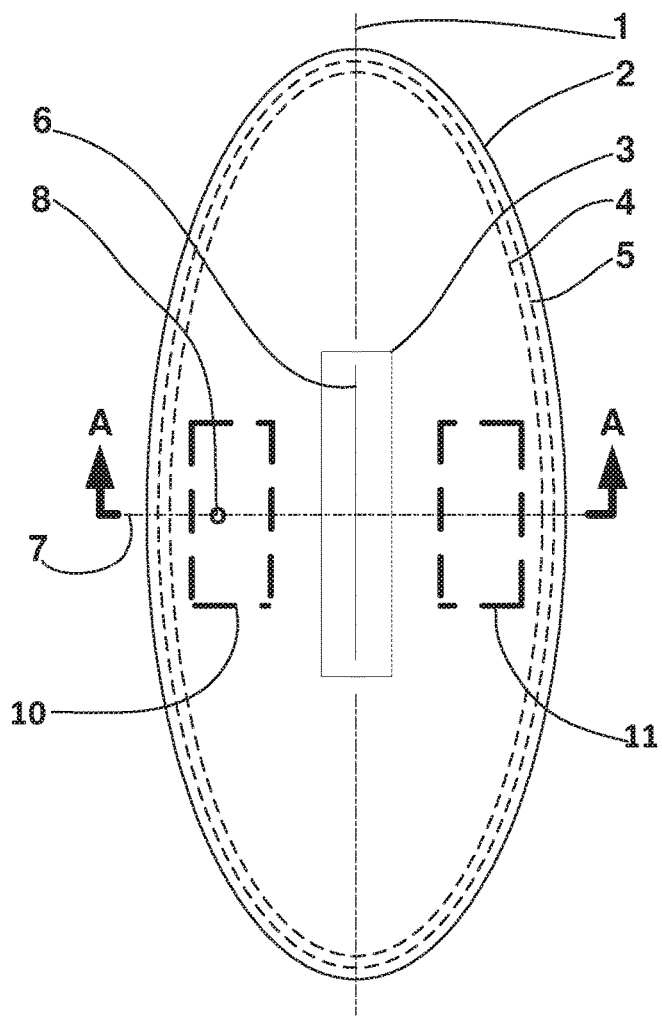
FIG. 3A shows a top view of a football equipped (instrumented) with two pressure transducer devices.
Figure 3B:
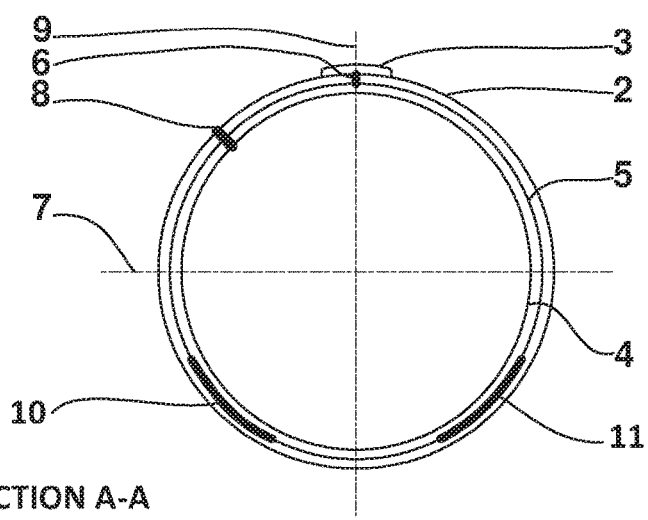
FIG. 3B shows a center section view of a football equipped (instrumented) with two pressure transducer devices.

FIG. 3A and FIG. 3B

FIG. 3A shows a top view of a conventional football implanted (equipped) (instrumented) with two pressure transducer devices.

FIG. 3B shows a center section view of the conventional football implanted (equipped) (instrumented) with two pressure transducer devices.

The detailed physical elements disclosed in the drawing shown in FIG. 3A and FIG. 3B are identified as follows:

1 is the y-axis of the football.

2 is the outer surface of the cover-liner of the football.

3 are the laces of the football.

4 is the inside surface of the football bladder.

5 is the space (interface) between the outside surface of the football bladder and the inside surface of the football cover-liner.

6 is the slot opening through the football cover-liner.

7 is the x-axis of the football.

8 is the air valve of the football bladder.

9 is the z-axis of the football.

10 is a pressure transducer device situated in the space (interface) 5 between the outside surface of the football bladder and the inside surface of the football cover-liner. 10 is in the form of a smooth thin sheet. The surface of 10 conforms to the shape of surface 5 as shown. 10 is in the form of a smooth thin sheet of finite thickness having liner material attached on its surface facing the bladder. The purpose of the liner is to protect the bladder surface from wear and damage.

11 is a pressure transducer device situated in the space (interface) 5 between the outside surface of the football bladder and the inside surface of the football cover-liner. 11 is in the form of a smooth thin sheet. The surface of 11 conforms to the shape of surface 5 as shown. 11 is in the form of a smooth thin sheet of finite thickness having liner material attached on its surface facing the bladder. The purpose of the liner is to protect the bladder surface from wear and damage.

10 and 11 are symmetrically located about 9 in order to balance their moment of inertia around 9.

10 and 11 are located directly opposite 6 in order to contribute mildly toward balancing 3 about 7. The mass of 10 and 11 is very much smaller than the mass of 3.

FIG. 3A and FIG. 3B represent a preferred embodiment of the present invention equipped with two pressure transducer devices for measuring the football pressure.

In order to read the football's pressure from each of the pressure transducer devices implanted inside the football, a pressure readout device is required. Each pressure readout device is external to the football and is wirelessly coupled to the pressure transducer devices.

See FIG. 8, FIG. 10A and FIG. 10B, FIG. 11, and FIG. 14 for examples of pressure readout devices.

The plurality of pressure transducer devices provides for a backup in the unlikely event that one or more of the pressure transducers fail to operate properly due to damage incurred before or during the game. In addition, the pressure measurements from the five pressure transducer devices can be averaged together if the game officials so desire.

Figure 4A:
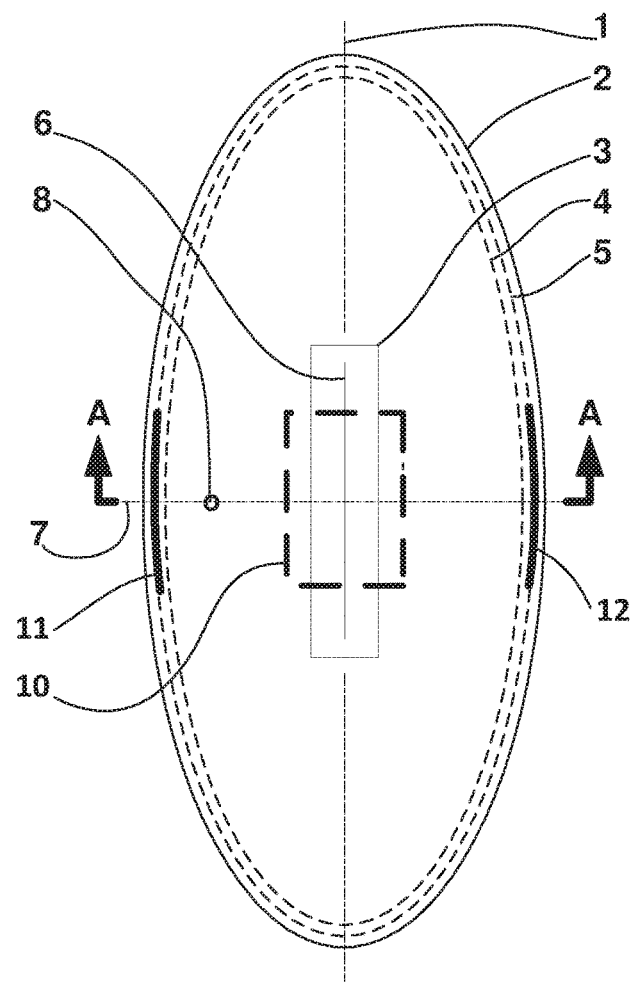
FIG. 4A shows a top view of a football equipped (instrumented) with three pressure transducer devices.
Figure 4B:
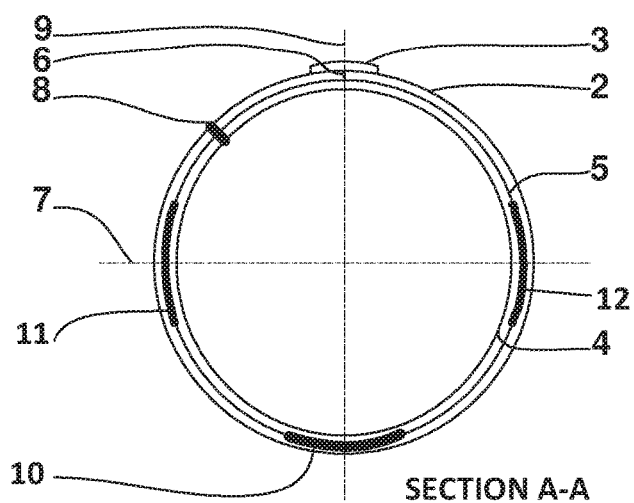
FIG. 4B shows a center section view of a football equipped (instrumented) with three pressure transducer devices.

FIG. 4A and FIG. 4B

FIG. 4A shows a top view of a conventional football implanted (equipped) (instrumented) with three pressure transducer devices.

FIG. 4B shows a center section view of the conventional football implanted (equipped) (instrumented) with three pressure transducer devices.

The detailed physical elements disclosed in the drawing shown in FIG. 4A and FIG. 4B are identified as follows:

1 is the y-axis of the football.

2 is the outer surface of the cover-liner of the football.

3 are the laces of the football.

4 is the inside surface of the football bladder.

5 is the space (interface) between the outside surface of the football bladder and the inside surface of the football cover-liner.

6 is the slot opening through the football cover-liner.

7 is the x-axis of the football.

8 is the air valve of the football bladder.

9 is the z-axis of the football.

10 is the pressure transducer device situated in the space (interface) 5 between the outside surface of the football bladder and the inside surface of the football cover-liner. 10 is in the form of a smooth thin sheet. The surface of 10 conforms to the shape of surface 5 as shown. 10 is in the form of a smooth thin sheet of finite thickness having liner material attached on its surface facing the bladder. The purpose of the liner is to protect the bladder surface from wear and damage.

11 is the pressure transducer device situated in the space (interface) 5 between the outside surface of the football bladder and the inside surface of the football cover-liner. 11 is in the form of a smooth thin sheet. The surface of 10 conforms to the shape of surface 5 as shown. 11 is in the form of a smooth thin sheet of finite thickness having liner material attached on its surface facing the bladder. The purpose of the liner is to protect the bladder surface from wear and damage.

12 is the pressure transducer device situated in the space (interface) 5 between the outside surface of the football bladder and the inside surface of the football cover-liner. 12 is in the form of a smooth thin sheet. The surface of 12 conforms to the shape of surface 5 as shown. 12 is in the form of a smooth thin sheet of finite thickness having liner material attached on its surface facing the bladder. The purpose of the liner is to protect the bladder surface from wear and damage.

11 and 12 are symmetrically located about 7 in order to balance their moment of inertia around 7. The center of gravity of 11 and 12 is located at the origin of 1, 7 and 9 in order to balance their moment of inertia about 1, 7 and 9.

10 is located directly opposite 3 in order to contribute mildly toward balancing 3 about 7. The mass of 10 is very much smaller than the mass of 3.

FIG. 4A and FIG. 4B represent a preferred embodiment of the present invention equipped with three pressure transducer devices for measuring the football pressure.

In order to read the football's pressure from each of the pressure transducer devices implanted inside the football, a pressure readout device is required. Each pressure readout device is external to the football and is wirelessly coupled to the pressure transducer devices.

See FIG. 8, FIG. 10A and FIG. 10B, FIG. 11, and FIG. 14 for examples of pressure readout devices.

The plurality of pressure transducer devices provides for a backup in the unlikely event that one or more of the pressure transducers fail to operate properly due to damage incurred before or during the game. In addition, the pressure measurements from the five pressure transducer devices can be averaged together if the game officials so desire.

Figure 5A:
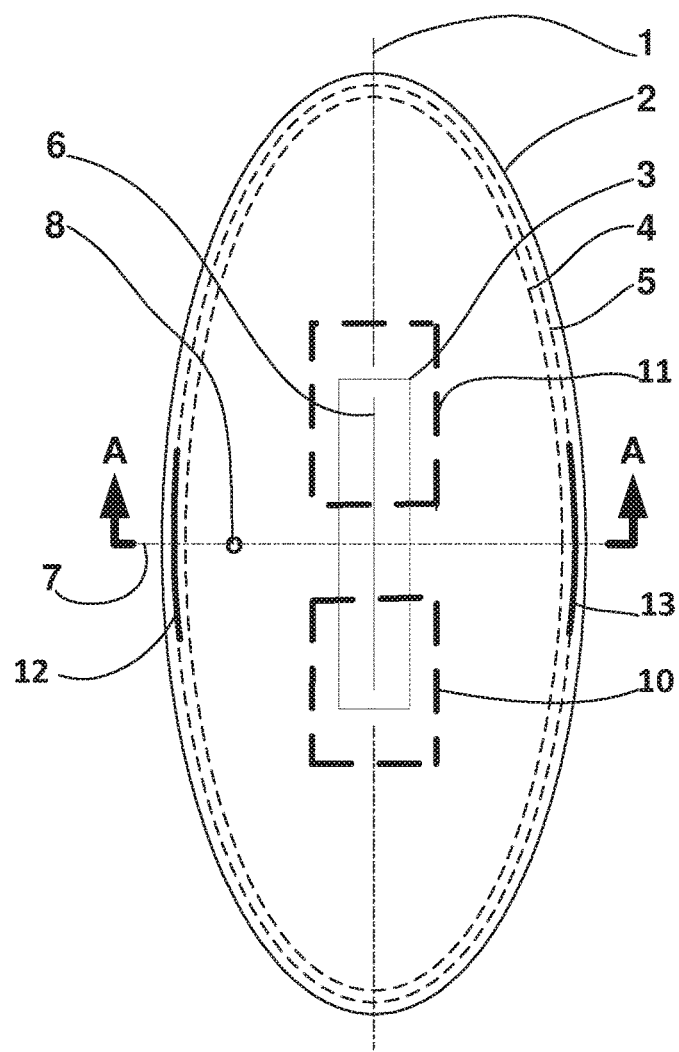
FIG. 5A shows a top view of a football equipped (instrumented) with four pressure transducer devices.
Figure 5B:
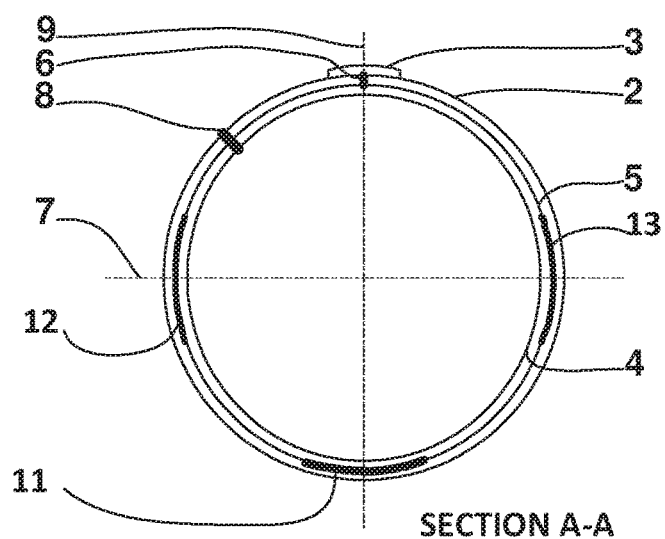
FIG. 5B shows a center section view of a football equipped (instrumented) with four pressure transducer devices.

FIG. 5A and FIG. 5B

FIG. 5A shows a top view of a conventional football implanted (equipped) (instrumented) with four pressure transducer devices.

FIG. 5B shows a center section view of the conventional football implanted (equipped) (instrumented) with four pressure transducer devices.

The detailed physical elements disclosed in the drawing shown in FIG. 5A and FIG. 5B are identified as follows:

1 is the y-axis of the football.
2 is the outer surface of the cover-liner of the football.
3 are the laces of the football.
4 is the inside surface of the football bladder.
5 is the space (interface) between the outside surface of the football bladder and the inside surface of the football cover-liner.
6 is the slot opening through the football cover-liner.
7 is the x-axis of the football.
8 is the air valve of the football bladder.
9 is the z-axis of the football.
10 is the pressure transducer device situated in the space (interface) 5 between the outside surface of the football bladder and the inside surface of the football cover-liner. 10 is in the form of a smooth thin sheet. The surface of 10 conforms to the shape of surface 5 as shown. 10 is in the form of a smooth thin sheet of finite thickness having liner material attached on its surface facing the bladder. The purpose of the liner is to protect the bladder surface from wear and damage.

11 is the pressure transducer device situated in the space (interface) 5 between the outside surface of the football bladder and the inside surface of the football cover-liner. 11 is in the form of a smooth thin sheet. The surface of 11 conforms to the shape of surface 5 as shown. 11 is in the form of a smooth thin sheet of finite thickness having liner material attached on its surface facing the bladder. The purpose of the liner is to protect the bladder surface from wear and damage.

12 is the pressure transducer device situated in the space (interface) 5 between the outside surface of the football bladder and the inside surface of the football cover-liner. 12 is in the form of a smooth thin sheet. The surface of 12 conforms to the shape of surface 5 as shown. 12 is in the form of a smooth thin sheet of finite thickness having liner material attached on its surface facing the bladder. The purpose of the liner is to protect the bladder surface from wear and damage.

13 is the pressure transducer device situated in the space (interface) 5 between the outside surface of the football bladder and the inside surface of the football cover-liner. 13 is in the form of a smooth thin sheet. The surface of 13 conforms to the shape of surface 5 as shown. 13 is in the form of a smooth thin sheet of finite thickness having liner material attached on its surface facing the bladder. The purpose of the liner is to protect the bladder surface from wear and damage.

12 and 13 are symmetrically located about 7 in order to balance their moment of inertia around 7. The center of gravity of 12 and 13 is located at the origin of 1, 7 and 9 in order to balance their moment of inertia about 1, 7 and 9.

10 and 11 are located directly opposite 3 across from 7 in order to contribute mildly toward balancing 3 about 7. The mass of 10 and 11 is very much smaller than the mass of 3.

10 and 11 are symmetrically located with respect to 9 in order to balance their moment of inertia about 9.

FIG. 5A and FIG. 5B represent a preferred embodiment of the present invention equipped with four pressure transducer devices for measuring the football pressure.

In order to read the football's pressure from each of the pressure transducer devices implanted inside the football, a pressure readout device is required. Each pressure readout device is external to the football and is wirelessly coupled to the pressure transducer devices.

See FIG. 8, FIG. 10A and FIG. 10B, FIG. 11, and FIG. 14 for examples of pressure readout devices.

The plurality of pressure transducer devices provides for a backup in the unlikely event that one or more of the pressure transducers fail to operate properly due to damage incurred before or during the game. In addition, the pressure measurements from the five pressure transducer devices can be averaged together if the game officials so desire.

Figure 6A:
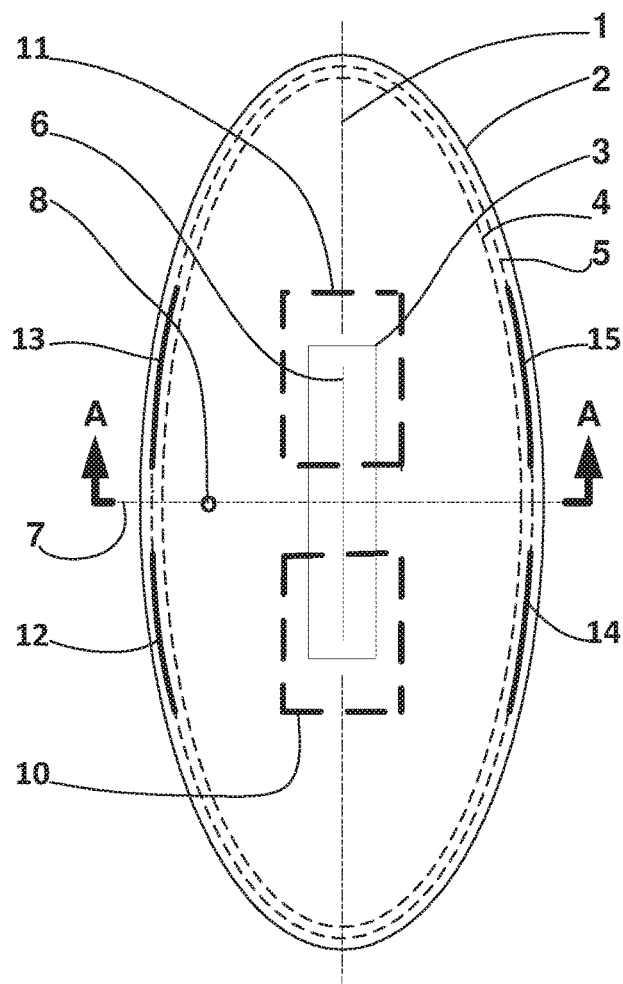
FIG. 6A shows a top view of a football equipped (instrumented) with five pressure transducer devices.
Figure 6B:
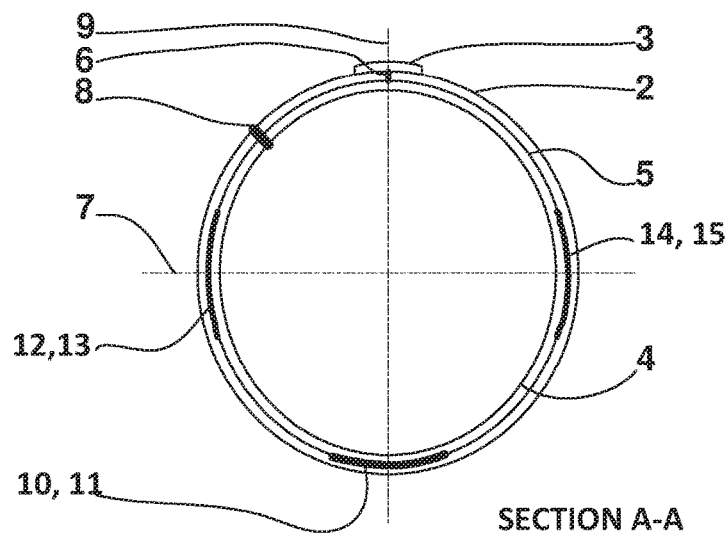
FIG. 6B shows a center section view of a football equipped (instrumented) with five pressure transducer devices.

FIG. 6A and FIG. 6B

FIG. 6A shows a top view of a conventional football implanted (equipped) (instrumented) with six pressure transducer devices.

FIG. 6B shows a center section view of the conventional football implanted (equipped) (instrumented) with six pressure transducer devices.

The detailed physical elements disclosed in the drawing shown in FIG. 6A and FIG. 6B are identified as follows:

1 is the y-axis of the football.

2 is the outer surface of the cover-liner of the football.

3 are the laces of the football.

4 is the inside surface of the football bladder.

5 is the space (interface) between the outside surface of the football bladder and the inside surface of the football cover-liner.

6 is the slot opening through the football cover-liner.

7 is the x-axis of the football.

8 is the air valve of the football bladder.

9 is the z-axis of the football.

10 is a pressure transducer device situated in the space (interface) 5 between the outside surface of the football bladder and the inside surface of the football cover-liner. 10 is in the form of a smooth thin sheet. The surface of 10 conforms to the shape of surface 5 as shown. 10 is in the form of a smooth thin sheet of finite thickness having liner material attached on its surface facing the bladder. The purpose of the liner is to protect the bladder surface from wear and damage.

11 is a pressure transducer device situated in the space (interface) 5 between the outside surface of the football bladder and the inside surface of the football cover-liner. 11 is in the form of a smooth thin sheet. The surface of 11 conforms to the shape of surface 5 as shown. 11 is in the form of a smooth thin sheet of finite thickness having liner material attached on its surface facing the bladder. The purpose of the liner is to protect the bladder surface from wear and damage.

12 is a pressure transducer device situated in the space (interface) 5 between the outside surface of the football bladder and the inside surface of the football cover-liner. 12 is in the form of a smooth thin sheet. The surface of 12 conforms to the shape of surface 5 as shown. 12 is in the form of a smooth thin sheet of finite thickness having liner material attached on its surface facing the bladder. The purpose of the liner is to protect the bladder surface from wear and damage.

13 is a pressure transducer device situated in the space (interface) 5 between the outside surface of the football bladder and the inside surface of the football cover-liner. 13 is in the form of a smooth thin sheet. The surface of 13 conforms to the shape of surface 5 as shown. 13 is in the form of a smooth thin sheet of finite thickness having liner material attached on its surface facing the bladder. The purpose of the liner is to protect the bladder surface from wear and damage.

14 is a pressure transducer device situated in the space (interface) 5 between the outside surface of the football bladder and the inside surface of the football cover-liner. 14 is in the form of a smooth thin sheet. The surface of 14 conforms to the shape of surface 5 as shown. 14 is in the form of a smooth thin sheet of finite thickness having liner material attached on its surface facing the bladder. The purpose of the liner is to protect the bladder surface from wear and damage.

15 is a pressure transducer device situated in the space (interface) 5 between the outside surface of the football bladder and the inside surface of the football cover-liner. 15 is in the form of a smooth thin sheet. The surface of 15 conforms to the shape of surface 5 as shown. 15 is in the form of a smooth thin sheet of finite thickness having liner material attached on its surface facing the bladder. The purpose of the liner is to protect the bladder surface from wear and damage.

12, 13, 14 and 15 are symmetrically located about 7 in order to balance their moment of inertia around 7. The center of gravity of 12, 13, 14 and 15 is located at the origin of 1, 7 and 9 in order to balance their moment of inertia about 1,7 and 9.

10 and 11 are located directly opposite 3 across from 7 in order to contribute mildly toward balancing 3 about 7. The mass of 10 and 11 is very much smaller than the mass of 3.

10 and 11 are symmetrically located with respect to 9 in order to balance their moment of inertia about 9.

FIG. 6A and FIG. 6B represent a preferred embodiment of the present invention equipped with six pressure transducer devices for measuring the football pressure.

In order to read the football's pressure from each of the pressure transducer devices implanted inside the football, a pressure readout device is required. Each pressure readout device is external to the football and is wirelessly coupled to the pressure transducer devices.

See FIG. 8, FIG. 10A and FIG. 10B, FIG. 11, and FIG. 14 for examples of pressure readout devices.

The plurality of pressure transducer devices provides for a backup in the unlikely event that one or more of the pressure transducers fail to operate properly due to damage incurred before or during the game. In addition, the pressure measurements from the five pressure transducer devices can be averaged together if the game officials so desire.

Figure 7A:
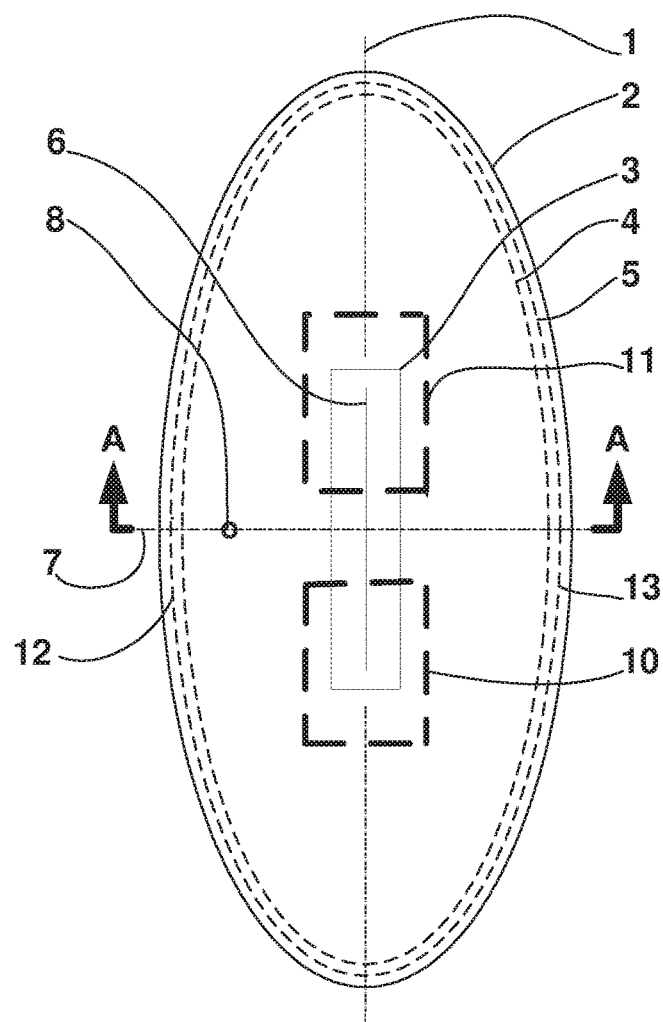
FIG. 7A shows a top view of a football equipped (instrumented) with two pressure transducer devices.
Figure 7B:
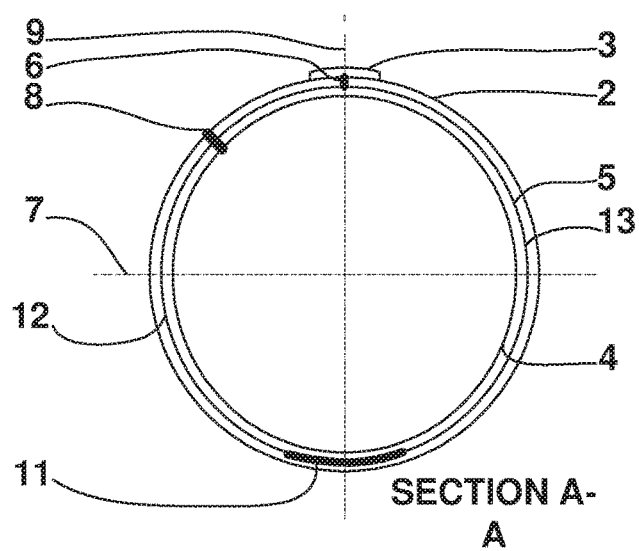
FIG. 7B shows a center section view of a football equipped (instrumented) with two pressure transducer devices.

FIG. 7A and FIG. 7B

FIG. 7A shows a top view of a conventional football implanted (equipped) (instrumented) with two pressure transducer devices.

FIG. 7B shows a center section view of the conventional football implanted (equipped) (instrumented) with two pressure transducer devices.

The detailed physical elements disclosed in the drawing shown in FIG. 7A and FIG. 7B are identified as follows:

1 is the y-axis of the football.

2 is the outer surface of the cover-liner of the football.

3 are the laces of the football.

4 is the inside surface of the football bladder.

5 is the space (interface) between the outside surface of the football bladder and the inside surface of the football cover-liner.

6 is the slot opening through the football cover-liner.

7 is the x-axis of the football.

8 is the air valve of the football bladder.

9 is the z-axis of the football.

10 is the pressure transducer device situated in the space (interface) 5 between the outside surface of the football bladder and the inside surface of the football cover-liner. 10 is in the form of a smooth thin sheet. The surface of 10 conforms to the shape of surface 5 as shown. 10 is in the form of a smooth thin sheet of finite thickness having liner material attached on its surface facing the bladder. The purpose of the liner is to protect the bladder surface from wear and damage.

11 is the pressure transducer device situated in the space (interface) 5 between the outside surface of the football bladder and the inside surface of the football cover-liner. 11 is in the form of a smooth thin sheet. The surface of 11 conforms to the shape of surface 5 as shown. 11 is in the form of a smooth thin sheet of finite thickness having liner material attached on its surface facing the bladder. The purpose of the liner is to protect the bladder surface from wear and damage.

10 and 11 are located directly opposite 3 across from 7 in order to contribute mildly toward balancing 3 about 7. The mass of 10 and 11 is very much smaller than the mass of 3.

10 and 11 are symmetrically located with respect to 9 in order to balance their moment of inertia about 9.

FIG. 7A and FIG. 7B represent a preferred embodiment of the present invention equipped with two pressure transducer devices for measuring the football pressure.

In order to read the football's pressure from each of the pressure transducer devices implanted inside the football, a pressure readout device is required. Each pressure readout device is external to the football and is wirelessly coupled to the pressure transducer devices.

See FIG. 8, FIG. 10A and FIG. 10B, FIG. 11, and FIG. 14 for examples of pressure readout devices.

The plurality of pressure transducer devices provides for a backup in the unlikely event that one or more of the pressure transducers fail to operate properly due to damage incurred before or during the game. In addition, the pressure measurements from the five pressure transducer devices can be averaged together if the game officials so desire.

FIG. 8

Figure 8:
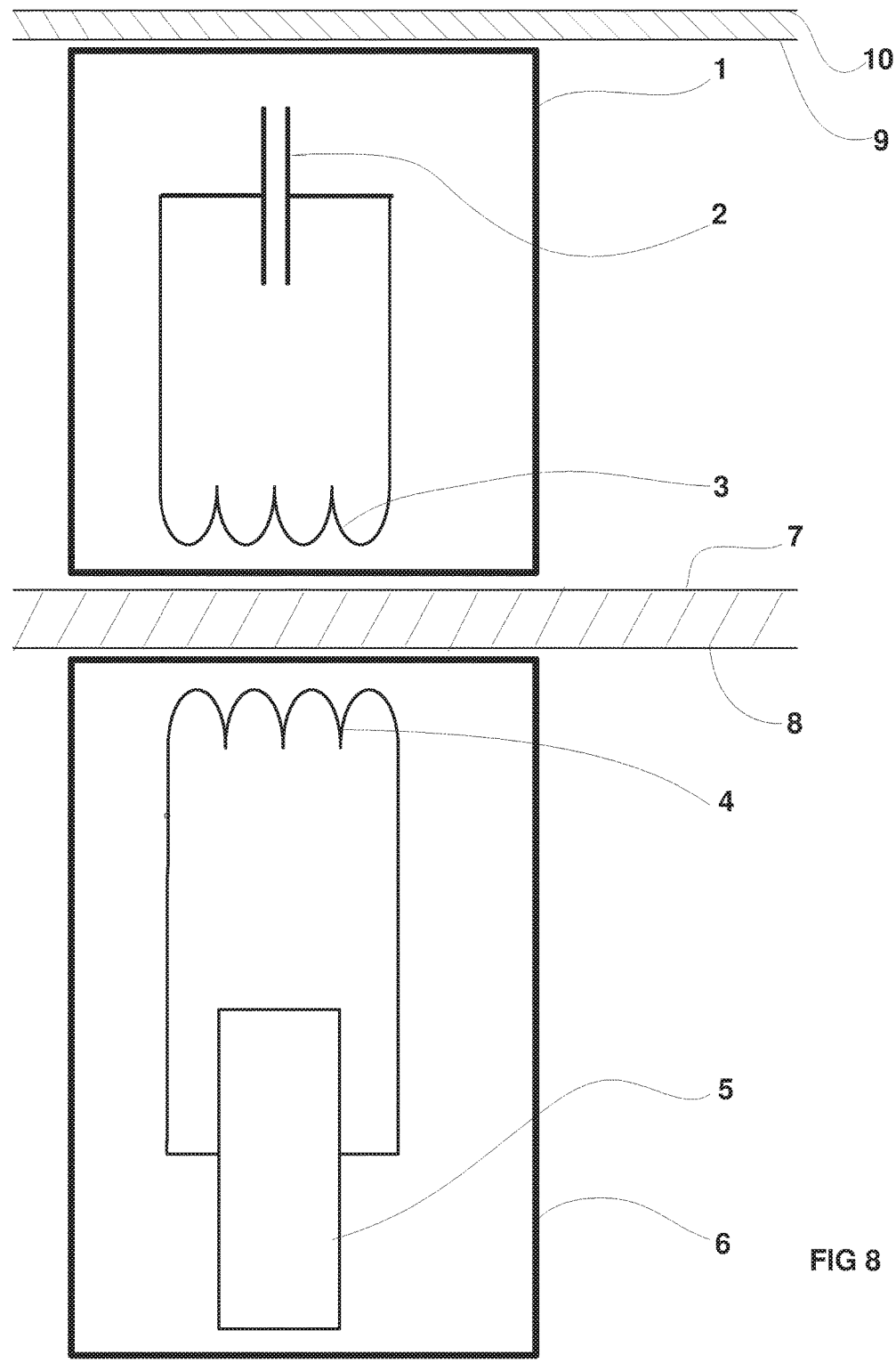
FIG. 8 shows a schematic electronics diagram of a pressure transducer device with an inductively coupled pressure readout device.

FIG. 8 shows a schematic electronics diagram of a pressure transducer device with an inductively coupled pressure readout device.

The detailed physical elements disclosed in the drawing shown in FIG. 8A are identified as follows:

1 is an electric circuit diagram of the pressure transducer device. 1 is comprised of a capacitive pressure transducer element 2 and an inductive winding element (or antenna element) 3.

2 is a capacitive pressure transducer element of 1 whose capacitance value C varies as a function of the applied pressure to the capacitive pressure transducer device element 2.

3 is a winding element (or antenna element) of the pressure transducer device 1. 3 is an inductor. 3 is connected in parallel with 2 to form an LC tank circuit. The inductance value of the winding element 3 is L.

4 is an inductor winding (or antenna element) of the pressure readout device 6. 4 is connected in parallel with 5. 1 is seen by 5 as a load coupled to 4. This load has a resonant frequency. 3 and 4 are inductively (or electromagnetically) coupled depending on the value of the ranges of the frequencies of oscillation of the LC tank circuit. If 3 and 4 are loosely coupled, then the resonant frequency of 1 depends primarily on the values of 2 and 3.

5 is comprised of a digitally sweepable (variable) frequency generator, a frequency spectrum analyzer, a pressure readout display calibrated in psi (pounds per square inch), and a transceiver. 5 carries the transceiver circuit for transmitting the football bladder pressure measurements to remote receivers where the readings can be viewed by the game officials and the spectators. The transceiver is for encoding the football's ID and local time with the football's pressure; and for transmitting the football's ID and local time with the football's pressure from the pressure readout display to remote receivers; and for receiving control commands from the remote receivers for regulating the flow of the data. The pressure readout display displays the football's pressure to game officials.

Figure 11:
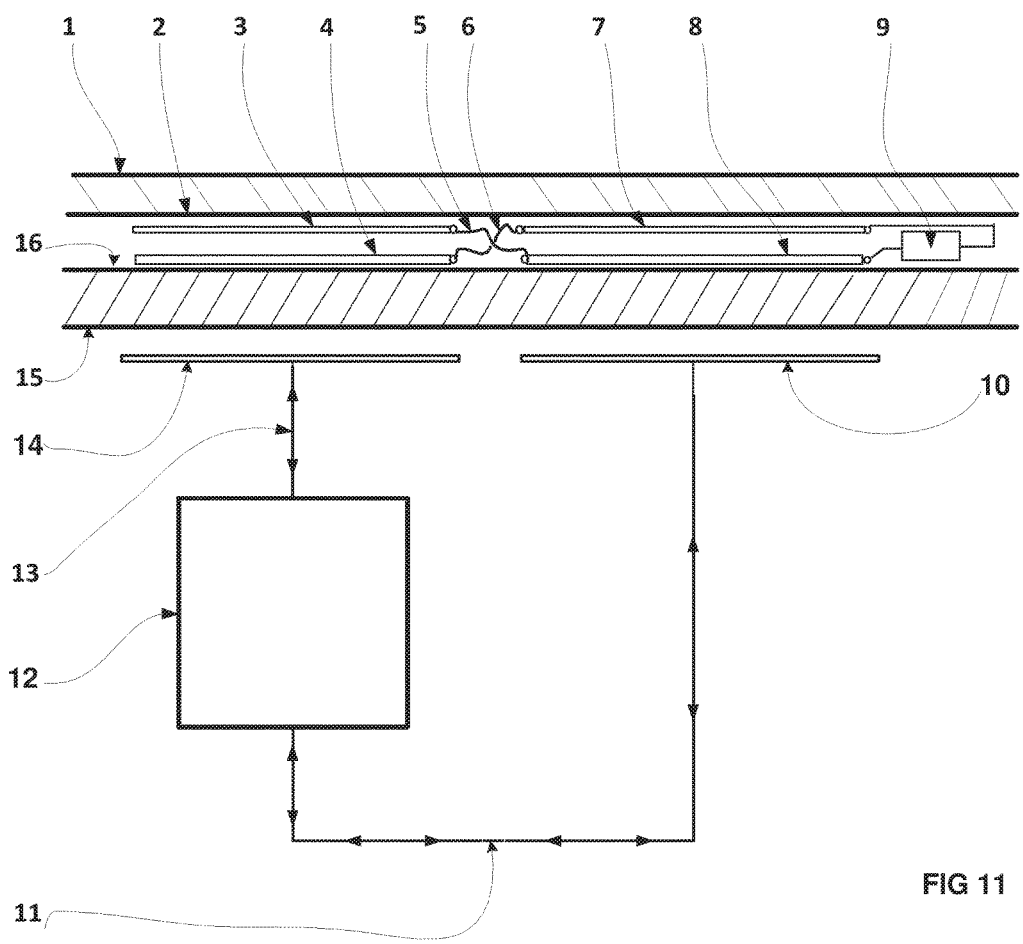
FIG. 11 shows a schematic electronics diagram of a pressure transducer device and a pressure readout device wherein the pressure transducer device is comprised of two parallel connected pressure transducer capacitors capacitively coupled to the pressure readout device.

See FIG. 11 for a description of a capacitively coupled pressure readout device.

6 is the pressure readout device. 6 comprises 5 and a winding element (or antenna element) 4. 6 is positioned with a small finite air space separation between 6 and 8 so as not to put undue external pressure on 8. Putting any significant external pressure on 8 could translate to an increase in bladder pressure and thereby cause inaccuracies in the bladder pressure readings.

7 is the inside surface of the instrumented football's cover-liner.

8 is the outside surface (outer skin) of the instrumented football's cover-liner.

9 is the outside surface of the inflated football bladder.

10 is the inside surface of the inflated football bladder.

In a preferred embodiment, the pressure readout device 6 is located externally to the instrumented football's cover-liner outside surface 8. The pressure readout device's 6 winding element (or antenna element) 4 is positioned in light contact with the outside surface 8 of the cover-liner outside surface 8 directly over the location of each of the pressure transducer device's 1 winding element (or antenna element) 3 for whose pressure is to be measured by 6. The physical separation between 1 and 6 is then the thickness of the cover-liner between surface 7 and surface 8. 1 acts as a load for 6.

3 and 4 are wirelessly coupled to one another. 3 and 4 are coupled together by magnetic induction for a range of lower oscillator resonant frequencies, for example in the lower KHz range. In this case, 3 and 4 act like inductors where mutual magnetic fields link their windings.

3 and 4 are coupled to one another electromagnetically for a range of higher oscillator resonant frequencies, for example in the MHz range. In this range of resonant frequencies 3 and 4 behave like antennas which radiate and re-radiate electrical energy to one another.

The pressure transducer device 1 has a capacitive pressure transducer 2 whose capacitance varies directly with the applied pressure from being sandwiched between the inflated football bladder's outside surface 9 and the Inside surface 7 of the cover-liner. The pressure transducer device 1 is sandwiched between the outside surface 9 of the football bladder and the inside surface 7 of the football cover-liner. 4 serves as the primary winding of an air core transformer. 3 serves as the secondary winding of the air core transformer. In a preferred embodiment, the pressure transducer device 1 takes the form of a sheet (sheath) of finite thickness. 1 is stimulated to oscillate by the electric current in 6 without the need for 1 to have its own battery. 1 receives its electrical energy from 6 between 4 and 3.

A battery in 1 is undesirable because it adds mass to the football which can change the instrumented football's handling and playability.

The resonant frequency of the tank circuit depends on the capacitance of 2 and the inductive coupling between 3 and 4 as seen by 5 (assumed to be approximately L for simplicity). The resonant frequency decreases as the bladder pressure increases. Resonance occurs when 1 is driven from external source 5 at a frequency at which the inductive and capacitive reactances as seen by 5 are equal in magnitude.

The tank circuit resonates at a resonant frequency f when the inductive reactance and the capacitive reactance of the circuit are equal. This occurs when $$f = 1/2\pi \times 1/\mathrm{SQUAREROOT}(LC) \text{ HZ}$$

The digitally sweepable (variable) frequency generator 5 is made to automatically continuously scan across the frequency band covering and including the resonant frequency. The resonant frequency is dependent on the bladder pressure when the resonant frequency measurement is made. The National Football League requires that the bladder pressure during games be within the limits of between 12.5 and 13.5 psi. This pressure range gives rise to a band of corresponding possible resonant frequencies. The digitally sweepable (variable) frequency generator 5 scans across and beyond both sides of this band to locate the resonant frequency f.

When the circuits inside 5 detect that the frequency of the digitally sweepable (variable) frequency generator 5 is equal to the frequency where 1 resonates, i.e. where the variable frequency of 5 matches the resonant frequency of 1, the readout on 5 displays the bladder pressure in psi. The bladder pressure is calibrated to the frequency value of the digitally sweepable (variable) frequency generator 5. If the bladder pressure is read out to be between 12.5 and 13.5 psi, the football bladder pressure is judged by the game officials to be within acceptable pressure limits and the football can be used in the game. If the bladder pressure is read out to be outside the 12.5 to 13.5 psi pressure range, the football bladder pressure is judged to be unacceptable by the game officials and the football cannot be used in the game. Of course the football can always be re-pressurized and brought within the 12.5 and 13.5 psi range. It is not clear at this time whether the NFL rules would permit the re-pressurized football to be re-certified and brought back into the game; or whether there needs to be a waiting period after a football is re-pressurized to assure that the football is physically able to hold its new pressure.

In summary, the preferred embodiment is a system comprised of a battery-less pressure transducer device and a pressure readout device. The pressure transducer device is carried by the football for sensing the football pressure. There is a known mathematical function relationship between the pressure and the capacitance of the pressure transducer device based on the construction of 2. The pressure transducer device's LC tank circuit oscillates electrically at its resonant frequency when the pressure transducer device is wirelessly stimulated (excited) to oscillate by the pressure readout device. The pressure readout device reads the pressure transducer device's resonant frequency of oscillation and uses an algorithm based on the known mathematical function to transform the resonant frequency to bladder pressure i.e. the pressure readout device derives the pressure from the resonant frequency. The pressure readout device then communicates the pressure to remote sites for game officials and spectators to observe. The algorithm is derived from the functional relationship between the pressure and the resonant frequency. The algorithm is known from the configuration of the pressure transducer device as a mathematical function between the resonant frequency and the pressure.

The pressure transducer device is sandwiched between the football's bladder and the football's cover-liner. The form of the pressure transducer device is a sheet of finite thickness to and facing the bladder. The form of the pressure transducer device is compliant with the contour of the space between the bladder and the cover-liner. The pressure transducer device oscillates electrically at a frequency which is a function of the bladder pressure when the pressure transducer device is stimulated (excited) to oscillate. This frequency is the resonant frequency of the LC tank circuit where C is a function of the pressure.

The pressure transducer device is comprised of an LC tank circuit.

The LC tank circuit is comprised of a first pressure transducer capacitor and an inductor. The capacitance of the first pressure transducer capacitor is a function of the bladder pressure. The inductor and the first pressure transducer capacitor are wired in parallel with one another.

The first pressure transducer capacitor is comprised of a first dynamic conductive plate facing the bladder and disposed substantially parallel to said bladder and a first static conductive plate facing the cover-liner and disposed substantially parallel to the cover-liner.

The inductor of the LC tank circuit is inductively coupled to the first inductor of the pressure readout device using the thickness of the cover-liner as a dielectric spacer medium.

The first dynamic conductive plate and the first static conductive plate are disposed substantially parallel to one another and separated by a finite distance. The first dynamic conductive plate deforms under pressure thereby changing the average distance between the plates. The distance and therefore the capacitance of the first pressure transducer capacitor is a function of bladder pressure.

The pressure readout device is comprised of a first inductor for inductively coupling the pressure readout device to the inductor of the LC tank circuit; and a digitally sweepable frequency generator for exciting the tank circuit to oscillate at its resonant frequency; and a frequency spectrum analyzer for scanning the band which includes the resonant frequency of the tank circuit; and a pressure readout display for displaying the pressure and a transceiver for communicating the pressure to remote sites.

The pressure readout device is for wirelessly stimulating the pressure transducer device to oscillate at its resonant frequency. The value of the resonant frequency of oscillation of the pressure transducer device is a function of the bladder pressure bearing down on the pressure transducer device. This functional relationship is used to derive the algorithm for transforming the resonant frequency to the bladder pressure. The algorithm is known from the configuration of the pressure transducer device as a mathematical function between the resonant frequency and the pressure.

The pressure readout device is positioned externally to the football and in contact with the outside surface of the cover-liner and centered above the sandwiched pressure transducer device. The pressure readout device is wirelessly inductively coupled to the pressure transducer device. The pressure readout device is wirelessly coupled to the pressure transducer device to provide electrical power to the pressure transducer device.

The pressure readout device is inductively coupled to the pressure transducer device for lower resonant frequencies.

For high resonant frequencies, the pressure readout device is electromagnetically coupled to the pressure transducer device since the inductor of the LC tank circuit and the inductor of the pressure readout device behave as antennas.

The pressure readout device wirelessly measures the resonant frequency of oscillation of the pressure transducer device; and by use of the algorithm transforms the resonant frequency of oscillation to the value of the bladder's pressure. The algorithm is derived from the functional relationship between pressure and frequency. The algorithm is known from the configuration of the pressure transducer device as a mathematical function between the resonant frequency and the pressure.

The pressure readout device is configured with at least one digital display for viewing the value of the bladder's pressure.

The pressure readout device is comprised of a transceiver. The transceiver is for transmitting the value of the bladder's pressure to remote sites for viewing by game officials and spectators. The pressures can be monitored continuously by the game officials and by the spectators. The pressures of a plurality of footballs can be monitored simultaneously by the game officials and by the spectators.

Figure 9A:
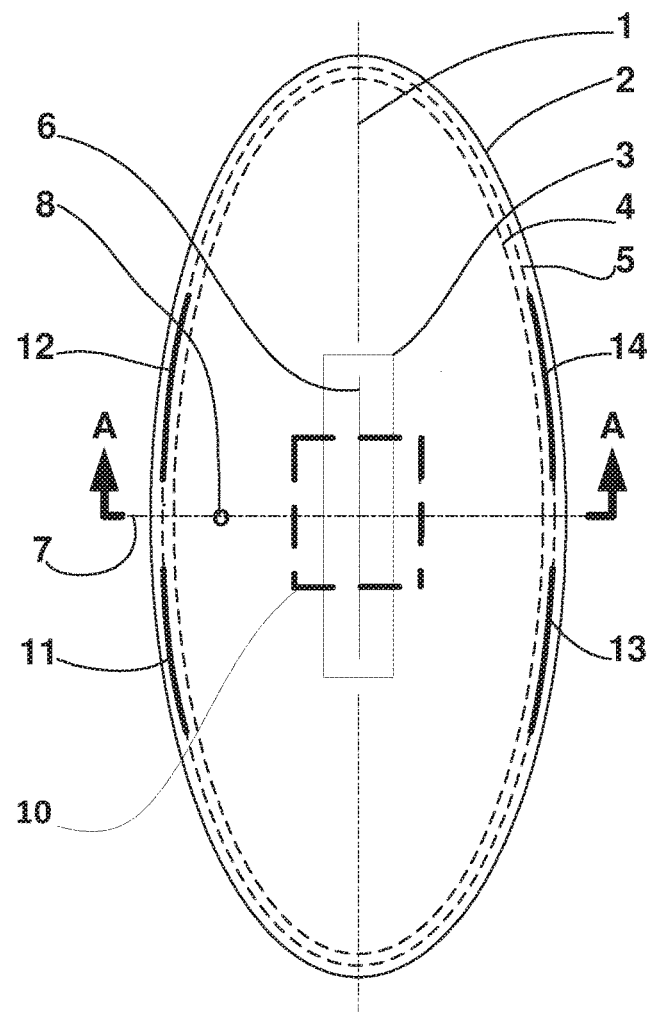
FIG. 9A shows a top view of a football equipped (instrumented) with two pressure transducer devices.
Figure 9B:
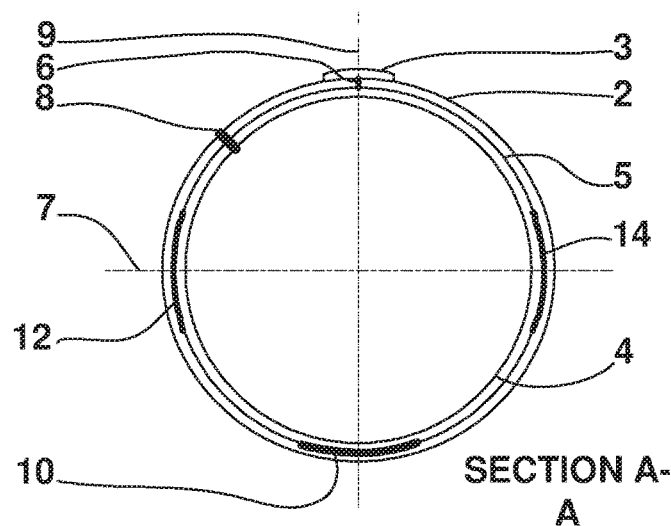
FIG. 9B shows a center section view of a football equipped (instrumented) with two pressure transducer devices.

FIG. 9A and FIG. 9B

FIG. 9A shows a top view of a conventional football implanted (equipped) (instrumented) with five pressure transducer devices.

FIG. 9B shows a center section view of the conventional football implanted (equipped) (instrumented) with five pressure transducer devices.

The detailed physical elements disclosed in the drawing shown in FIG. 9A and FIG. 9B are identified as follows:

1 is the y-axis of the football.
2 is the outer surface of the cover-liner of the football.
3 are the laces of the football.
4 is the inside surface of the football bladder.
5 is the space (interface) between the outside surface of the football bladder and the inside surface of the football cover-liner.
6 is the slot opening through the football cover-liner.
7 is the x-axis of the football.
8 is the air valve of the football bladder.
9 is the z-axis of the football.
10 is the pressure transducer device situated in the space (interface) 5 between the outside surface of the football bladder and the inside surface of the football cover-liner. 10 is in the form of a smooth thin sheet. The surface of 10 conforms to the shape of surface 5 as shown. 10 is in the form of a smooth thin sheet of finite thickness having liner material attached on its surface facing the bladder. The purpose of the liner is to protect the bladder surface from wear and damage.
11 is the pressure transducer device situated in the space (interface) 5 between the outside surface of the football bladder and the inside surface of the football cover-liner. 11 is in the form of a smooth thin sheet. The surface of 11 conforms to the shape of surface 5 as shown. 11 is in the form of a smooth thin sheet of finite thickness having liner material attached on its surface facing the bladder. The purpose of the liner is to protect the bladder surface from wear and damage.
12 is the pressure transducer device situated in the space (interface) 5 between the outside surface of the football bladder and the inside surface of the football cover-liner. 12 is in the form of a smooth thin sheet. The surface of 12 conforms to the shape of surface 5 as shown. 12 is in the form of a smooth thin sheet of finite thickness having liner material attached on its surface facing the bladder. The purpose of the liner is to protect the bladder surface from wear and damage.
13 is the pressure transducer device situated in the space (interface) 5 between the outside surface of the football bladder and the inside surface of the football cover-liner. 13 is in the form of a smooth thin sheet. The surface of 13 conforms to the shape of surface 5 as shown. 13 is in the form of a smooth thin sheet of finite thickness having liner material attached on its surface facing the bladder. The purpose of the liner is to protect the bladder surface from wear and damage.
14 is the pressure transducer device situated in the space (interface) 5 between the outside surface of the football bladder and the inside surface of the football cover-liner. 14 is in the form of a smooth thin sheet. The surface of 14 conforms to the shape of surface 5 as shown. 14 is in the form of a smooth thin sheet of finite thickness having liner material attached on its surface facing the bladder. The purpose of the liner is to protect the bladder surface from wear and damage.
11, 12, 13, and 14 are symmetrically located about 7 and 9 in order to balance their moment of inertia around 7 and 9. The center of gravity of 11, 12, 13, and 14 are located at the origin of 1, 7 and 9 in order to balance their moment of inertia about 1, 7 and 9.

10 is located directly opposite 3 across from 7 in order to contribute mildly toward balancing 3 about 7. The mass of 10 is very much smaller than the mass of 3.

10 is symmetrically located with respect to 9 in order to balance its moment of inertia about 9.

FIG. 9A and FIG. 9B shows a conventional bladder having inside surface 4 and outside surface 5. The bladder is inflated inside a conventional football cover-liner 2. In a preferred embodiment, five pressure transducer devices 10, 11, 12, 13, 14 are shown captured (sandwiched) in the space 5 between the inflated bladder and the cover-liner at five different points around the y-axis 1 of the football. FIG. 9A and FIG. 9B represent a preferred embodiment of the present invention.

The y-axis 1 is the long mechanical centerline of the football cover-liner 2. The five points are chosen inside the instrumented football so that the location of the combined center of gravity of the pressure transducer devices helps to compensate for the offset in the location of the center of gravity of the conventional football relative to the y-axis 1 caused by the asymmetry of the mass distribution of the laces 3 and the air valve 8 being concentrated on one side of the football.

The combined masses of the pressure transducer devices tend to mildly drag the center of gravity of the instrumented football closer to the y-axis. Since the combined mass of the laces 3 and the air valve 8 is greater than the combined mass of the pressure transducer devices, the compensation realized is however limited. In addition, however limited, the mass of each of the pressure transducer devices is kept to a minimum in order control any increase in the weight of the instrumented football which might affect the football's handling and playability. Furthermore, the mass of each of the pressure transducer devices and their positioning is arranged around the x-axis, y-axis and z-axis in order to control any changes in the moments of inertia of the instrumented football about the x-axis, y-axis and z-axis, which might affect the football's handling and playability.

Pressure is exerted on both surfaces of the pressure transducer devices as the bladder is inflated to its target operating pressure between 12.5 and 13.5 psi. Pressure is exerted inwardly on each pressure transducer device by the cover-liner. Pressure is exerted outwardly on each pressure transducer device by the inflated bladder. Each pressure transducer device independently measures the football bladder pressure. Theoretically, the measurements should be the same. The measurements are therefore theoretically redundant.

The plurality of pressure transducer devices provides for a backup in the unlikely event that one or more of the pressure transducers fail to operate properly due to damage incurred before or during the game. In addition, the pressure measurements from the five pressure transducer devices can be averaged together if the game officials so desire.

In order to read the football's pressure from each of the pressure transducer devices implanted inside the football, a pressure readout device is required. Each pressure readout device is external to the football and is wirelessly coupled to the pressure transducer devices.

See FIG. 8, FIG. 10A and FIG. 10B, FIG. 11, and FIG. 14 for examples of pressure readout devices.

FIG. 10

Figure 10A:
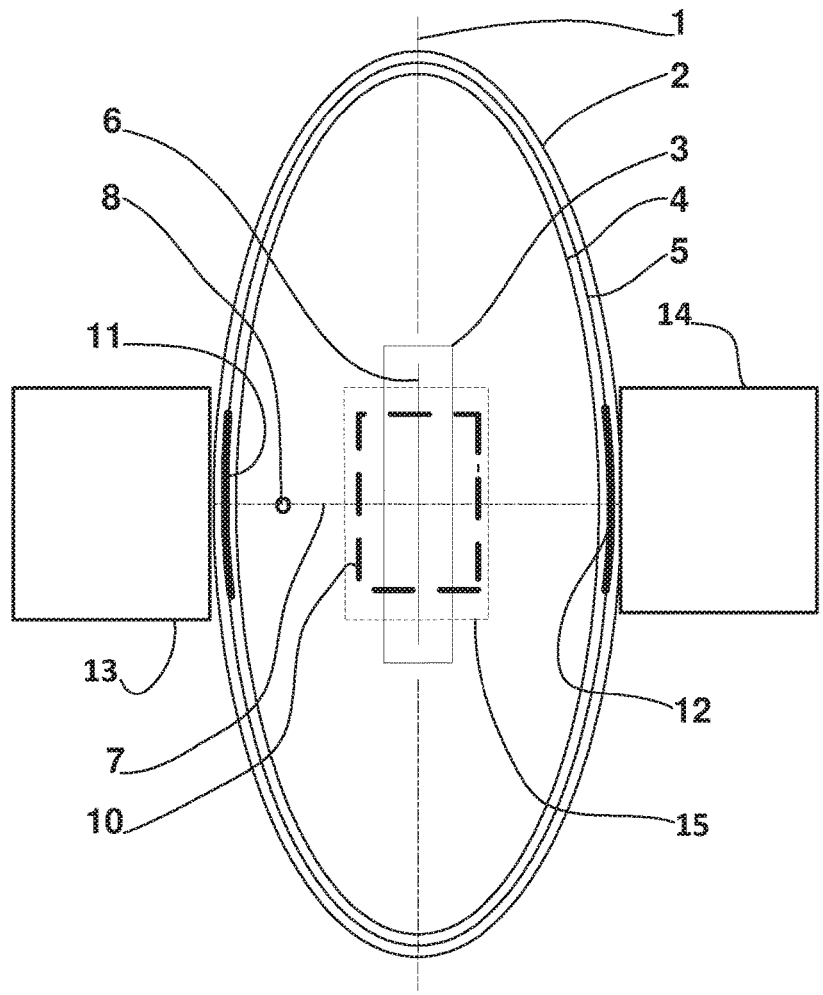
FIG. 10A shows the top view of an apparatus for measuring the bladder pressure of an instrumented football equipped (instrumented) using three pressure transducer devices with three pressure readout devices.

FIG. 10A shows the top view of an apparatus for measuring the bladder pressure of an instrumented football equipped (instrumented) using three pressure transducer devices with three pressure readout devices.

Figure 10B:
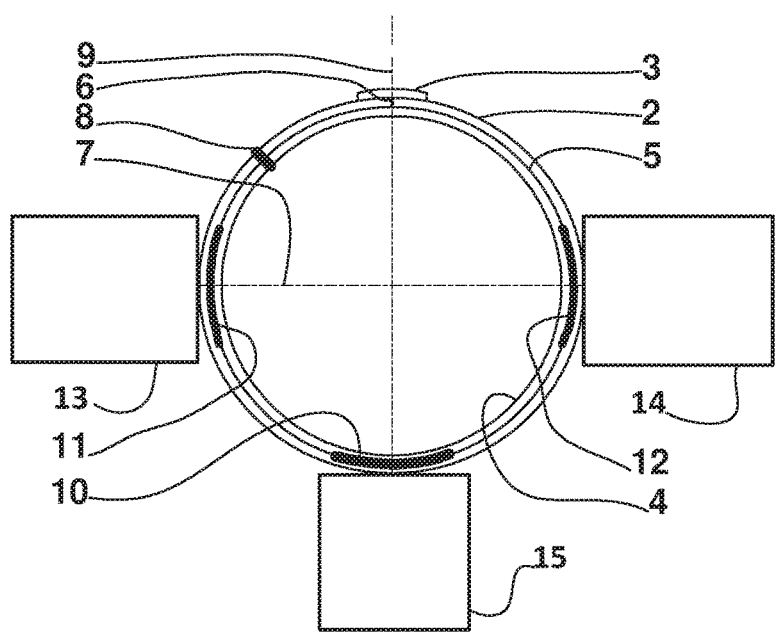
FIG. 10B shows an end view of an apparatus for measuring the bladder pressure of an instrumented football equipped (instrumented) using three pressure transducer devices with three pressure readout devices.

FIG. 10B shows an end view of an apparatus for measuring the bladder pressure of an instrumented football equipped (instrumented) using three pressure transducer devices with three pressure readout devices.

The detailed physical elements disclosed in the drawing shown in FIG. 10 are identified as follows:

1 is the y-axis of the football.
2 is the outer surface of the cover-liner of the football.
3 are the laces of the football.
4 is the inside surface of the football bladder.
5 is the space (interface) between the outside surface of the football bladder and the inside surface of the football cover-liner.
6 is the slot opening through the football cover-liner.
7 is the x-axis of the football.
8 is the air valve of the football bladder.
9 is the z-axis of the football.
10 is the pressure transducer device situated in the space (interface) 5 between the outside surface of the football bladder and the inside surface of the football cover-liner. 10 is in the form of a smooth thin sheet. The surface of 10 conforms to the shape of surface 5 as shown. 10 is in the form of a smooth thin sheet of finite thickness having liner material attached on its surface facing the bladder. The purpose of the liner is to protect the bladder surface from wear and damage.
11 is the pressure transducer device situated in the space (interface) 5 between the outside surface of the football bladder and the inside surface of the football cover-liner. 11 is in the form of a smooth thin sheet. The surface of 11 conforms to the shape of surface 5 as shown. 11 is in the form of a smooth thin sheet of finite thickness having liner material attached on its surface facing the bladder. The purpose of the liner is to protect the bladder surface from wear and damage.
12 is the pressure transducer device situated in the space (interface) 5 between the outside surface of the football bladder and the inside surface of the football cover-liner. 12 is in the form of a smooth thin sheet. The surface of 12 conforms to the shape of surface 5 as shown. 12 is in the form of a smooth thin sheet of finite thickness having liner material attached on its surface facing the bladder. The purpose of the liner is to protect the bladder surface from wear and damage.
13 is a pressure readout device.
14 is a pressure readout device.
15 is a pressure readout device.

In a preferred embodiment, the three pressure readout devices 13, 14 and 15 are for reading the bladder pressure of the instrumented football 2 equipped (instrumented) with three pressure transducer devices 10, 11 and 12. The pressure readout devices and the pressure transducer devices are referred to in FIG. 8 and in FIG. 11. The three pressure readout devices 13, 14 and 15 act to readout bladder pressure independently of one another. The three pressure readout devices are identical to one another. 13 reads 11. 14 reads 12. 15 reads 10. 13 is wirelessly coupled to 11. 14 is wirelessly coupled to 12. 15 is wirelessly coupled to 10.

The three pressure readout devices 13, 14 and 15 are positioned with a small finite air space separation between themselves and 2 so as not to put external pressure on 2. Putting external pressure on 2 could translate to an increase in bladder pressure and thereby cause inaccuracies in the bladder pressure readings which should be avoided.

Pressure readout device 13 wirelessly reads and displays the bladder pressure sensed by pressure transducer device 11. Pressure readout device 14 wirelessly reads and displays the bladder pressure sensed by pressure transducer device 12. Pressure readout device 15 wirelessly reads and displays the bladder pressure sensed by pressure transducer device 10.

Pressure readout device 13, 14 and 15 are mounted externally to the outside surface of the cover-liner 2 of the instrumented football.

Pressure readout device 13 is mounted facing pressure transducer device 11.

Pressure readout device 14 is mounted facing pressure transducer device 12.

Pressure readout device 15 is mounted facing pressure transducer device 10.

In a similar way, the pressure measured by the pressure transducer devices shown in FIG. 2A and FIG. 2B, FIG. 3A and FIG. 3B, FIG. 4A and FIG. 4B, FIG. 5A and FIG. 5B, FIG. 6A and FIG. 6B, FIG. 7A and FIG. 7B and FIG. 9A and FIG. 9B are wirelessly read and displayed by similar pressure readout devices as shown in FIG. 10A and FIG. 10B.

The pressure transducer devices shown in FIG. 2A and FIG. 2B, FIG. 3A and FIG. 3B, FIG. 4A and FIG. 4B, FIG. 5A and FIG. 5B, FIG. 6A and FIG. 6B, FIG. 7A and FIG. 7B and FIG. 9A and FIG. 9B which are implanted inside the football's do not measure the football's pressure directly. The transducers, in combination with their circuitry, provide a resonant frequency which is dependent on the football's pressure. That resonant frequency is read and transformed by calibration to psi.

FIG. 11

FIG. 11 shows a schematic electronics diagram of a pressure transducer device and a pressure readout device wherein the pressure transducer device is comprised of two parallel connected pressure transducer capacitors capacitively coupled to the pressure readout device.

The detailed physical elements disclosed in the drawing shown in FIG. 11 are identified as follows:

1 and 2 are the inside and outside surfaces of the football bladder respectively.
2 is the outside surface of the football bladder pressing against the two pressure transducer capacitor plates 3 and 7.
1 is the inside surface of the football bladder facing the interior of the football bladder
3 and 4 are the plates of the first pressure transducer capacitor whose capacitance value is C2. The units of capacitance are Farads. 3 is pressed upon by 2. 4 is pressed upon by 16. Both 3 and 4 are conductive plates. 3 and 4 are spaced and parallel to each other. The value C2 changes with football pressure.
5 is hardwiring connecting plates 4 and 7.
6 is hardwiring connecting plates 3 and 8.
7 and 8 are the plates of the second pressure transducer capacitor whose capacitance value is C1. 7 is a pressure transducer plate, 7 is pressed upon by 2. Both 7 and 8 are conductive plates. 8 is pressed upon by 16. The value C1 changes with football pressure "P".
8 is a plate of capacitor C1. Pressure "P" is exerted on 8 by the football cover liner surface 16.
9 is an inductor. 9 is hardwired across plates 7 and 8. The value of the inductor is L expressed in Henries.

FIG. 11 represents a preferred embodiment of the present invention.

The pressure transducer device is comprised of two pressure transducer capacitors whose capacities are C1 and C2, and an inductor 9. The pressure transducer device is in the form of a compliant thin sheet of finite thickness. The pressure transducer device can be easily slipped between the football bladder and the football cover-liner. The pressure transducer device conforms to the shape of the space between the football bladder and the football cover-liner. The pressure transducer devices are of very low mass compared to the mass of the football laces.

The pressure transducer device is capacitively coupled to the pressure readout device. 4 is capacitively coupled to 14 across the football cover-liner which acts as a dielectric spacer between 4 and 14. 8 is capacitively coupled to 17 across the football cover-liner which acts as a dielectric spacer between 8 and 17.

3, 4, 7, 8, and 9 are captured snugly in the space parallel to 2 and 16 when the football bladder is inflated.

The pressure readout device circuitry is comprised of two conducting plates 10 and 14. In the lower frequency ranges, 10 is capacitively coupled to 8, and 14 is capacitively coupled to 4. In the higher frequency ranges, 10 is electromagnetically coupled to 8 and 14 is electromagnetically coupled to 4, because in this frequency range 10 and 14 act as antennas.

11 is hardwiring connecting 9 to 12.

10 and 14 are positioned with a very small finite air space separation with 15 so as not to put undue external pressure on 15. Putting any significant external pressure on 15 could translate to an increase in bladder pressure and thereby cause inaccuracies in the bladder pressure readings.

12 is comprised of a digitally sweepable (variable) frequency generator, a frequency spectrum analyzer, a pressure readout display, and a transceiver. The pressure readout device circuitry is comprised of 10, 11, 12, 13 and 14. The pressure readout display is calibrated in psi (pounds per square inch) and displays the pressure of the football bladder. The pressure readout device circuitry is contained in an enclosure. The enclosure is not shown to reduce clutter if the figure. The transceiver is for encoding the football's ID and local time with the football's pressure; and for transmitting the football's ID and local time with the football's pressure from the pressure readout display to remote receivers along with other data deemed necessary by game officials; and for receiving control commands from the remote receivers for regulating the flow of the data.

13 is hardwiring connecting 12 and 14.

The pressure transducer device circuit is comprised of two capacitively coupled pressure transducer capacitors C1 and C2. C1 and C2 can be disposed next to one another or separated from one another in the space between the football cover liner and the football bladder. C1 has two plates 7 and 8. C2 has two plates 3 and 4. Since C1 and C2 are duplicates of one another, the capacitance values of C1 and C2 are equal to one another.

The pressure transducer device is also comprised of an inductive element 9. 9 is hardwired across plates 7 and 8. 9 has an inductance equal to L. 3 is hardwired to 8 via hardwiring 5.

4 is hardwired to 7 via hardwiring 5. 3, 4, 7, 8 and 9 are sandwiched between the inflated football bladder and the cover-liner. The football bladder has an inside surface 1 containing pressurized air. The football bladder has an outside surface 2 normally pressing against the inside surface 16 of the football's cover-liner except where the pressure transducer devices are present.

15 and 16 are the outside and inside surfaces of the football cover-liner respectively. The cover-liner acts as a dielectric between plates 4 and 14 thereby enabling 4 to be capacitively coupled to 14. The cover-liner acts as a dielectric between plates 8 and 10 thereby enabling 8 to be capacitively coupled to 10. Therefore, 12 is capacitively coupled to 4 and 8 via 14 and 10.

This capacitive coupling enables 12 to excite the pressure transducer device's tank circuit comprised of L in parallel with C1 and C2. This capacitive coupling also enables 12 to listen for the resonant frequency of the tank circuit with its spectrum analyzer. The readout frequency of the spectrum analyzer is calibrated in psi. The spectrum analyzer scans the band which includes the resonant frequency of the tank circuit.

In a preferred embodiment, the pressure readout device is located externally to the instrumented football's cover-liner's outside surface 15. The pressure readout device's envelop (not shown) which contains 10 and 14 is positioned at the surface 15 of the cover-liner directly over the location of the pressure transducer device.

The physical separation between 15 and 16 is the thickness of the cover-liner.

The pressure readout device and the pressure transducer device are wirelessly capacitively coupled to one another. The pressure transducer capacitors C1 and C2 operate in parallel with one another yielding an effective capacitance of C3 which is equal to the sum of C1 and C2.

C3 and L act in parallel with one another forming a tank circuit. The tank circuit has a resonant frequency f. For a large value of L and C3 the resonant frequency is in the KHz range. For a small value of L and C3 the resonant frequency is in the MHz and GHZ range.

In the KHz range for example, 10 and 14 act as capacitor plates which are capacitively coupled to 4 and 8 respectively by electric fields. In the MHz and GHZ range, 10 and 14 act as antennas which are electromagnetically coupled to 4 and 8 respectively by electromagnetic fields.

The pressure readout device circuitry comprises a sweep frequency generator. The sweep frequency generator drives the LC tank circuit to oscillate. When the frequency of the sweep frequency generator is equal to the resonant frequency of the tank circuit, the tank circuit will resonate at frequency f.

The value of the equivalent pressure transducer capacitor C3 is driven by the football bladder's pressure. High football bladder pressures cause the value of C3 to go high. Low football bladder pressures cause the value of C3 to go low. High football bladder pressure causes the tank circuit to resonate in the low frequency range. Low football bladder pressure causes the tank circuit to resonate in the high frequency range.

The spectrum analyzer drives 10 and 14 to equal and opposite potentials. In order for the spectrum analyzer to drive the tank circuit, 4 and 8 must be driven to equal and opposite potentials. In order to accomplish this, 4 is hardwired to 7, and 8 is hardwired to 3. This hardwiring configuration is unique. This hardwiring configuration not only allows 4 and 8 to operate at opposite potentials thereby permitting the spectrum analyzer to be capacitively coupled to the tank circuit, but also allows C1 and C2 to operate in parallel with one another to combine the effect of the two pressure transducer capacitors, thereby doubling the combined pressure sensitivity of the circuit.

Notice that the pressure transducer device is comprised of two pressure transducer circuits wherein the two pressure transducer circuits are hardwired together to gain two advantages. The first advantage being to permit the circuits to be capacitively (coupled) driven by the pressure readout device circuit; and second advantage being to permit the two pressure transducer capacitors to be operated in parallel with one another thereby doubling the pressure sensitivity of the circuit.

The unique criss-crossing of the hard wiring 5 and 6 shown as connecting 3 with 8; and 4 with 7; allows this unique objective to be achieved.

In a preferred embodiment, the pressure transducer device has two capacitive pressure transducers C1 and C2 whose capacitance values vary directly with the applied pressure from the inflated football bladder. The pressure transducer device containing C1 and C2 is inserted and sandwiched between the outside surface 2 of the football bladder and the inside surface 16 of the football cover-liner. As the bladder is inflated, 2 presses on 3 and 7, and 16 presses on 4 and 8. The pressure transducer device adds negligible mass to the football compared to the mass of the football's conventional laces. The mass of the conventional football's laces asymmetrically loads the conventional football across the y-axis, thereby bringing the center of gravity of the conventional football slightly away from the y-axis and closer to the laces.

In a preferred embodiment, the pressure transducer device takes the form of a thin sheet (sheath) of finite thickness. Being capacitively coupled to 12 via 10 and 14, the pressure transducer device is stimulated to oscillate without the need for its own battery. The pressure transducer device receives its electrical energy from 12 by being capacitively coupled to 12 via 10 and 14.

A battery is undesirable because it adds mass to the instrumented football which can change the instrumented football's handling and playability compared to the conventional football. Perceptible changes to the handling and playability of the conventional football are likely to be unacceptable to the NFL and the players.

The resonant frequency "f" of the pressure transducer device's tank circuit depends on the effective capacitance C3 and on the inductance L3. Resonance occurs when the pressure transducer device tank circuit is driven at the frequency "f" by the spectrum analyzer. This resonance at "f" occurs providing that the capacitive coupling between 12 and the pressure transducer device's tank circuit is loose so as not to make the resonant frequency of the reactive load on 12 be a different resonant frequency than that of just the tank circuit.

12 is configured to continuously scan across the frequency band containing the resonant frequency. The resonant frequency is dependent on the bladder pressure when the frequency measurement is made by the spectrum analyzer.

The National Football League requires that the bladder pressure of the footballs measured before games be within the pressure limits of 12.5 and 13.5 psi. This pressure range gives rise to a possible band of resonant frequencies caused by changes in C3 with pressure. The spectrum analyzer scans across and beyond both sides of this band to locate the resonant frequency.

When the circuits inside 12 detect that the frequency of the spectrum analyzer is equal to the resonant frequency of the tank circuit, i.e. where the frequency of the spectrum analyzer matches the resonant frequency of the tank circuit, the readout then displays the bladder pressure in psi. The bladder pressure is calibrated to the frequency value of the spectrum analyzer. If the bladder pressure is read out to be between 12.5 and 13.5 psi, the football bladder pressure is judged to be within acceptable pressure limits and the football can be used in the game. If the bladder pressure is read out to be outside the 12.5 to 13.5 psi pressure range, the football bladder pressure is judged to be unacceptable and the football cannot be used in the game. Of course the football can always be re-pressurized and brought within the 12.5 and 13.5 psi range. It is not clear at this time whether the existing NFL rules permit the re-pressurized football to be re-certified and brought back into the game; or even whether there needs to be a waiting period to assure that the football is physically able to hold its pressure.

The pressure readout device circuitry of 12 serves five purposes. First, it stimulates the pressure transducer device circuitry to oscillate. Second, it reads the resonant frequency of oscillation of the pressure transducer device. Third, it calibrates the resonant frequency to football bladder pressure by converting the resonant frequency of oscillation to psi pressure units. Fourth, it displays the football bladder pressure. Fifth, it encodes and transmits the football bladder pressure to remote receivers. The pressure readout device circuitry is comprised of the following elements: a sweep frequency generator; a spectrum analyzer; a capacitive coupling plate 14; a capacitive coupling plate 10; a transceiver; and a display.

The following is a description of the circuit interconnectivity between the pressure transducer device and the pressure readout device. The sweep frequency generator and the spectrum analyzer within 12 are hardwired to plate 14. Plate 14 is capacitively coupled to plate 4 through the football cover-liner which acts as the dielectric medium filling the space between the plates. Plate 4 is hardwired to plate 7, thereby bringing the potential of plate 7 to that of plate 4. Plate 7 is hardwired to inductor 9. Inductor 9 has an inductance L1. Inductor 9 is hardwired to plate 8. Plate 8 is hardwired to plate 3 thereby bringing the potential of plate 3 to the potential of plate 8. Plate 8 is capacitively coupled to plate 10 through the football cover-liner which acts as the dielectric filling the space between the plates. Plate 10 is hardwired to the digitally sweepable (variable) frequency generator within 12. Plate 7 and plate 8 make up the first pressure transducer variable capacitor C1. Plate 3 and plate 4 make up the second pressure transducer variable capacitor C2. Since 3 and 8 operate at the same potential, and since 4 and 7 operate at the same potential, the equivalent capacitance in the pressure transducer device circuit is C1+C2. The inductor 9 and capacitors C1 and C2 n the pressure transducer device circuit form a tank circuit. The tank circuit resonates at a resonant frequency f when the inductive reactance and the capacitive reactance of the circuit are equal. This occurs when $$f = \frac{1}{2\pi} \times 1/\text{SQUAREROOT}((L)(C1+C2)) \text{ HZ}$$

Note that the right hand and left hand parts of the drawing can be separated to form two separate and distinct pressure transducers and pressure readout devices thereby permitting the pressure transducers and their readouts to operate at different locations inside the cover-liner of the instrumented football.

Now since C1 and C2 are functions of the bladder pressure "P", then "f" is also a function of the bladder pressure "P". We now can construct a table relating the values of "f" to the values of "P" by calibrating the resonant frequency "f" in terms of the bladder pressure "P", Therefore, whenever we measure a value "f" as the resonant frequency of the tank circuit, we know the pressure "P" that caused it. Therefore we have indirectly derived a value for the bladder pressure "P" by measuring the value of "f".

In summary, the preferred embodiment is a system comprised of a battery-less pressure transducer device and a pressure readout device. The pressure transducer device is carried by the football for sensing the football pressure. The pressure transducer device oscillates electrically when the pressure transducer device is wirelessly stimulated (excited) to oscillate by the pressure readout device. The pressure readout device reads the frequencies of electrical oscillation of the pressure transducer device by being electrically coupled to the pressure transducer device. The frequency spectrum analyzer is configured for electrically coupling to the pressure transducer device and is configured for scanning the frequency band of the pressure transducer device's electrical oscillations for determining the value of the resonant frequency of the pressure transducer device. The pressure readout device reads the pressure transducer device's resonant frequency of oscillation and uses an algorithm to transform the resonant frequency to bladder pressure. The algorithm is derived from the known mathematical functional relationship between the resonant frequency and the pressure. The pressure readout device then communicates the pressure to remote sites for game officials and spectators to observe. The algorithm is known from the configuration of the pressure transducer device as a mathematical function between the resonant frequency and the pressure.

The pressure transducer device is sandwiched between the football's bladder and the football's cover-liner. The form of the pressure transducer device is a sheet of finite thickness facing the bladder. The form of the pressure transducer device is compliant with the contour of the space between the bladder and the cover-liner. The pressure transducer device oscillates electrically at a frequency (the resonant frequency) which is a function of the bladder pressure when the pressure transducer device is stimulated (excited) to oscillate.

The pressure transducer device is comprised of an LC tank circuit.

The LC tank circuit is comprised of a first pressure transducer capacitor and a second pressure transducer capacitor and an inductor. The capacitance of the first pressure transducer capacitor is a function of the bladder pressure. The capacitance of the second pressure transducer capacitor is a function of the bladder pressure. The inductor and the first pressure transducer capacitor and the second pressure transducer capacitor are wired in parallel with one another.

The first pressure transducer capacitor is comprised of a first dynamic conductive plate facing the bladder and disposed substantially parallel to said bladder and a first static conductive plate facing the cover-liner and disposed substantially parallel to the cover-liner. The first static conductive plate of the first pressure transducer capacitor is capacitively coupled to the first conductive plate of the pressure readout device using the thickness of the cover-liner as a dielectric spacer medium.

The second pressure transducer capacitor is comprised of a second dynamic conductive plate facing the bladder and disposed substantially parallel to the bladder and a second static conductive plate facing the cover-liner and disposed substantially parallel to the cover-liner. The second static conductive plate of the second pressure transducer capacitor is capacitively coupled to the second conductive plate of the pressure readout device using the thickness of the cover-liner as a dielectric spacer medium.

The first dynamic conductive plate and the first static conductive plate are disposed substantially parallel to one another and separated by a finite distance. The first dynamic conductive plate deforms under pressure thereby changing the average distance between the plates. The distance and therefore the capacitance of the first pressure transducer capacitor is a function of bladder pressure.

The second dynamic conductive plate and the second static conductive plate are disposed substantially parallel to one another and separated by a finite distance. The second dynamic conductive plate deforms under pressure thereby changing the average distance between the plates. The distance and therefore the capacitance of the second pressure transducer capacitor is a function of bladder pressure.

The first static conductive plate of the first pressure transducer capacitor is wired to the second dynamic conductive plate of the second pressure transducer capacitor. The second static conductive plate of the second pressure transducer capacitor is wired to the first dynamic conductive plate of the first pressure transducer capacitor.

The pressure readout device is comprised of a first conductive plate for capacitively coupling the pressure readout device to the first static conductive plate of the first pressure transducer capacitor and a second conductive plate for capacitively coupling the pressure readout device to the second static conductive plate of the second pressure transducer capacitor and a digitally sweepable frequency generator for exciting the tank circuit to oscillate at its resonant frequency and a frequency spectrum analyzer for scanning the band which includes the resonant frequency of the tank circuit and a pressure readout display for displaying the pressure and a transceiver for communicating the pressure to remote sites.

The first static conductive plate of the first pressure transducer capacitor is capacitively coupled to the first conductive plate of the pressure readout device using the cover-liner as a dielectric spacer medium.

The second static conductive plate of the second pressure transducer capacitor is capacitively coupled to the second conductive plate of the pressure readout device using the cover-liner as a dielectric spacer medium.

The first pressure transducer capacitor is capacitively coupled to the first conductive plate of the pressure readout device and the second pressure transducer capacitor is capacitively coupled to the second conductive plate of the pressure readout device.

The pressure readout device is for wirelessly stimulating the pressure
transducer device to oscillate at its resonant frequency. The value
of the resonant frequency of oscillation of the pressure transducer device
is a function of the bladder pressure bearing down on the pressure
transducer device. This functional relationship is used to derive the algorithm.

The algorithm is known from the configuration of the pressure transducer device as a mathematical function between the resonant frequency and the pressure.

The pressure readout device is positioned externally to the football and in contact with the outside surface of the cover-liner and centered above the sandwiched pressure transducer device. The pressure readout device is electrically wirelessly coupled to the pressure transducer device. The pressure readout device is wirelessly coupled to the pressure transducer device to provide electrical power to the pressure transducer device.

In a preferred embodiment, the pressure readout device is inductively coupled to the pressure transducer device.

In another preferred embodiment, the pressure readout device is capacitively coupled to the pressure transducer device.

In yet another preferred embodiment, the pressure readout device is electromagnetically coupled to the pressure transducer device.

The pressure readout device wirelessly measures the resonant frequency of oscillation of the pressure transducer device; and by the algorithm transforms the resonant frequency of oscillation to the value of the bladder's pressure. The algorithm is derived from the mathematical functional relationship between pressure and frequency. The mathematical functional relationship between pressure and frequency is a product of the pressure transducer device configuration. The algorithm is known from the configuration of the pressure transducer device as a mathematical function between the resonant frequency and the pressure.

The pressure readout device is configured with at least one digital display for viewing the value of the bladder's pressure.

The pressure readout device is further configured with a transceiver. The transceiver is for transmitting the value of the bladder's pressure to remote sites for viewing by game officials and spectators alike. The pressures can be monitored continuously by the game officials and by the spectators. The pressures of a plurality of footballs can be monitored simultaneously by the game officials and by the spectators by using a plurality of test stands loaded with football's. By keeping the stimulus on continuously, the pressure transducer device will oscillate continuously; thereby enabling the pressure readout device to determine the pressure continuously; and thereby enabling the readout display to display the pressure to the game officials continuously. The transceiver will then continuously transmit the pressure to the spectators.

Figure 12A:
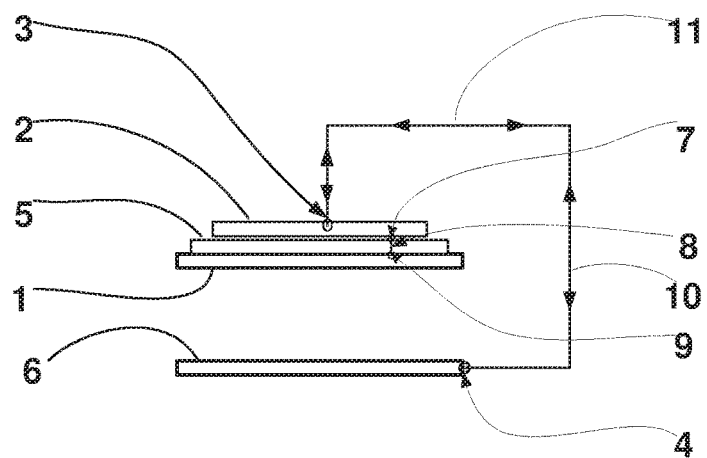
FIG. 12A and FIG. 12B shows a diagram of a pressure transducer device wherein the pressure transducer device is comprised of a dynamic pressure transducer capacitor plate and a static capacitor plate where a spiral wound inductor winding is integrated onto the static capacitor plate of the pressure transducer capacitor.
Figure 12B:
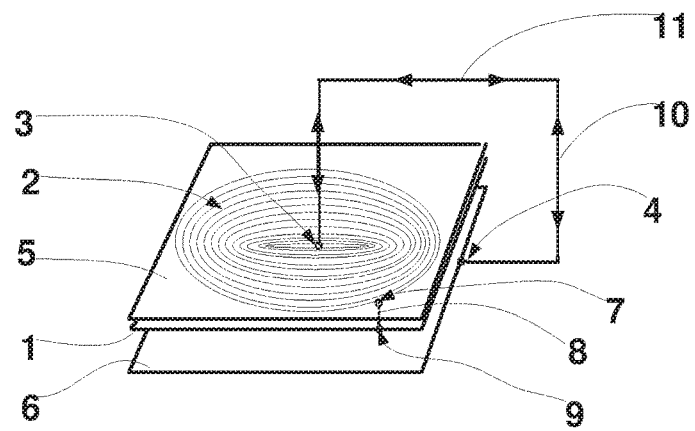

FIG. 12A and FIG. 12B

FIG. 12A and FIG. 12B shows a diagram of a pressure transducer device wherein the pressure transducer device is comprised of a dynamic pressure transducer capacitor plate and a static capacitor plate where a spiral wound inductor winding is integrated onto the static capacitor plate of the pressure transducer capacitor.

The detailed physical elements disclosed in the drawing shown in FIG. 12A and FIG. 12B are identified as follows:

1 is a conductive plate of the pressure transducer capacitor having capacity C1. 1 is static and does not sense pressure. The capacity C1 is expressed in nano and pico Farads. 1 is made from non-magnetic material to permit the passage of magnetic flux through it to 2.

2 is a flat spiral wound inductive winding comprised of a multitude of turns of conductive material. The value of the inductance of 2 is L1. The inductance L1 is expressed in mili, micro, nano and pico Henries. 1 and 2 lie parallel to one another. In a preferred embodiment, the spiral winding is comprised of circular windings. In another preferred embodiment, the spiral winding is comprised of rectangular windings.

3 is a hardwired connection point in the center of the winding 2.

10 is the hardwiring between 3 and 4.

4 is the hardwired connection point on plate 6.

5 is a thin insulator substrate of finite thickness between 2 and 1.

6 is a plate of the pressure transducer capacitor whose capacity is C1. 6 is dynamic and senses pressure "P". C1 varies with bladder pressure "P".

The dynamic pressure transducer capacitor plate 6 and the static pressure transducer capacitor plate 1 are disposed substantially parallel to one another and separated by a uniform symmetrical finite spacing. In a preferred embodiment, in the absence of pressure applied to 6, 6 is substantially flat. As pressure "P" is applied to 6, the surface of 6 deforms and is pushed closer to 1 and the value of C1 increases. Therefore, the value of C1 is a known mathematical function of "P". In another preferred embodiment there is a spacer between 1 and 6, which when compressed under pressure, brings 1 closer to 6, thereby changing C1. 6 is made from non-magnetic material to permit the passage of magnetic flux through it to 2.

1 and 6 are the plates of the pressure transducer capacitor whose capacity is C1. In practice, both 1 and 6 lie between the inside surface of the football's cover-liner and the outside surface of the football bladder.

In a preferred embodiment, the surfaces of 1, 2, 5 and 6 are pliable to conform to the surfaces of the football bladder and cover-liner location where they are placed inside the instrumented football.

In another preferred embodiment, the surfaces of 1, 2, 5 and 6 are pre-shaped to the form of the football bladder and cover-liner location where they will be placed inside the instrumented football.

7 is a hardwired connection point on the perimeter of 2.

8 is the hardwiring connection between 7 and 9. 8 passes through a clearance hole in 1. 8 connects 2 and 1 with a conductive path.

9 is a hardwired connection point on 1 for hardwiring 8.

10 and 11 is the hardwiring between the contact points 7 and 9 on 2 and 6 respectively.

The inductance L1 and capacitance C1 in the pressure transducer device circuit form an LC tank circuit. The tank circuit resonates at a resonant frequency "f" when the inductive reactance and the capacitive reactance of the circuit are equal. This occurs when $$f = \tfrac{1}{2}\pi \times 1/\mathrm{SQUAREROOT}(L1\,C1)\ \mathrm{HZ}$$

The resonant frequency "f" is a function of C1 and L1. As the pressure "P" increases, the value of C1 increases causing a decrease in the resonant frequency "f".

Now since C1 is a function of the bladder pressure "P", then "f" is also a function of the bladder pressure "P". We now can construct a table relating the values of "f" to the values of "P" by calibrating the resonant frequency "f" in terms of the functional relationship between "f" and the bladder pressure "P", Therefore, whenever we measure a value "f" as the resonant frequency of the tank circuit, we know the pressure "P" that caused it. Therefore we have indirectly derived a value for the bladder pressure "P" by measuring the value of "f".

In summary, in a preferred embodiment, the pressure transducer capacitor is comprised of a dynamic pressure transducer capacitor plate which is comprised of a non-magnetic electrically conducting material. The dynamic capacitor plate senses the football's pressure. The pressure changes the capacitance value of the pressure transducer capacitor. The pressure transducer capacitor is configured to be a known mathematical function of the bladder pressure.

The pressure transducer capacitor is also comprised of a static pressure transducer capacitor plate which is comprised of a non-magnetic electrically conducting material. The static plate of the pressure transducer capacitor does not sense pressure. Both the dynamic pressure transducer capacitor plate and the static pressure transducer capacitor plate are made of non-magnetic material to allow magnetic flux to pass through them so as not to interfere with the operation of the inductive winding.

The dynamic pressure transducer capacitor plate and the static pressure transducer capacitor plate are disposed substantially parallel to one another and separated by a finite spacing. The spacing is configured to be a known mathematical function of the bladder pressure. The capacitance of the pressure transducer capacitor is configured to be a known mathematical function of the spacing and therefore the capacitance of the pressure transducer capacitor is also a known mathematical function of the bladder pressure.

The pressure transducer capacitor is also comprised of a flat spiral wound inductive winding. The flat spiral wound inductive winding is comprised of
a multitude of turns of conductive material. In a preferred embodiment, the
flat spiral winding is comprised of circular windings. In another preferred embodiment, the flat spiral winding is comprised of rectangular windings.

In both preferred embodiments, the flat spiral wound inductive winding is wired in parallel with the pressure transducer capacitor.

The pressure transducer capacitor is also comprised of a thin non-magnetic insulator substrate of finite thickness disposed between the static capacitor plate and the flat spiral wound inductive winding. The substrate provides a mechanical mounting surface for supporting the flat spiral wound inductive winding on the static capacitor plate.

In a preferred embodiment, the static pressure transducer capacitor plate of the pressure transducer capacitor is for coupling the electrical oscillations of
the LC tank circuit to the pressure readout device using the thickness of the cover-liner as a spacer medium for enabling the pressure readout device to read the resonant frequency of the LC tank circuit where the resonant frequency of the pressure transducer device is configured to be a known mathematical function of the bladder pressure.

In yet another preferred embodiment, the flat spiral wound inductive winding of the pressure transducer capacitor is for coupling the electrical oscillations of the LC tank circuit to the pressure readout device using the thickness of the cover-liner as a spacer medium for enabling the pressure readout device to read the resonant frequency of the LC tank circuit where the resonant frequency of the pressure transducer device is configured to be a known mathematical function of the bladder pressure.

Figure 13A:
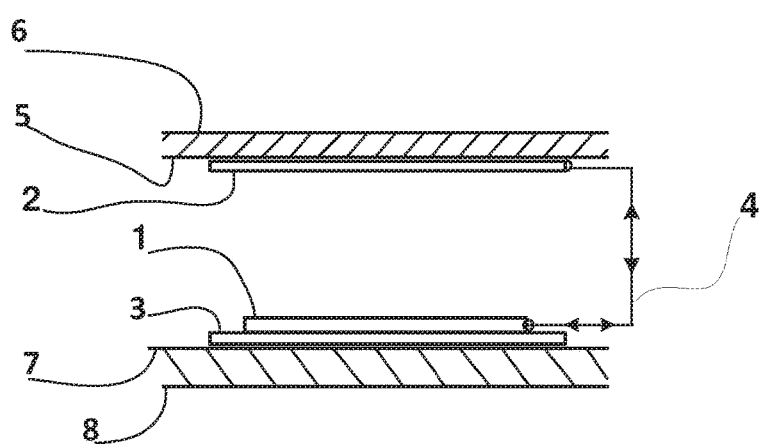
FIG. 13A and FIG. 13B shows a diagram of a pressure transducer device wherein the pressure transducer device is comprised of a dynamic pressure transducer capacitor plate and a spiral wound inductor winding which simultaneously acts as both an inductor and the static capacitor plate.
Figure 13B:
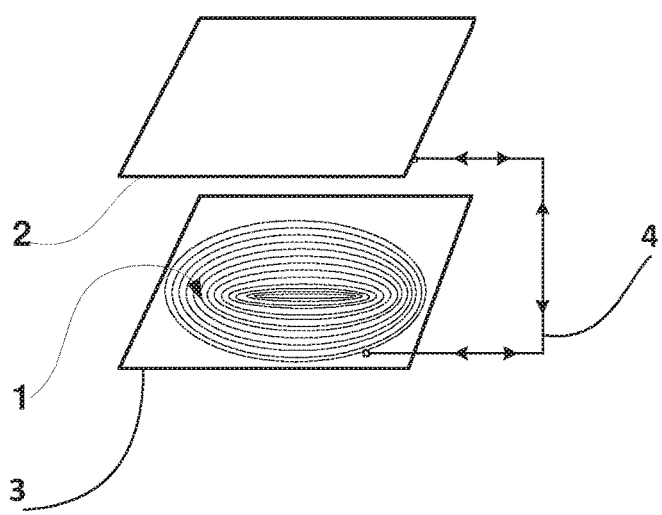

FIG. 13A and FIG. 13B

FIG. 13A and FIG. 13B shows a diagram of a pressure transducer device wherein the pressure transducer device is comprised of a dynamic pressure transducer capacitor plate and a spiral wound inductor winding which simultaneously acts as both an inductor and the static capacitor plate.

The detailed physical elements disclosed in the drawing shown in FIG. 13A and FIG. 13B are identified as follows:

1 is a flat spiral wound inductor winding made of conductive material and comprised of a multitude of turns. The value of the inductance of 1 is L1. The inductance of L1 is expressed in mili, micro, nano and pico Henries. The spiral wound inductor winding simultaneously acts as both an inductor with inductance L1 and a static capacitor plate which together with 2 has a capacity C1. 1 and 2 lie flat and parallel to one another. In a preferred embodiment, the spiral winding is comprised of circular windings. In another preferred embodiment, the spiral winding is comprised of rectangular windings.

2 is a plate of the pressure transducer capacitor whose capacity is C1. C1 varies with bladder pressure "P". 2 is dynamic and deformable under pressure and thereby senses pressure and changes the capacity of C1 by changing the separation distance between 2 and 1. Therefore, the value of C1 is a known mathematical function of "P". The capacity of C1 is expressed in pico Farads. The dynamic pressure transducer capacitor plate 2 and the static pressure transducer capacitor plate 1 are disposed substantially parallel to one another and separated by a uniform symmetrical finite spacing. In a preferred embodiment, as pressure is applied, 2 deforms, thereby changing the spacing between 1 and 2. The change in spacing causes a change in the value of the capacity C1. 2 is made from non-magnetic material to permit the passage of magnetic flux through it to 1. In another preferred embodiment there is a spacer between 1 and 2, which when compressed under pressure, brings 1 closer to 2, thereby changing C1.

3 is a thin insulating substrate that provides a mechanical mounting surface for supporting 1.

In a preferred embodiment, the surfaces of 1, 2 and 3 are pliable to conform to the surfaces of the football bladder and cover-liner location where they are placed inside the instrumented football.

In another preferred embodiment, the surfaces of 1, 2 and 3 are pre-shaped to the form of the football bladder and cover-liner location where they will be placed inside the instrumented football.

4 is hardwiring between 1 and 2.

5 is the outside surface of the football bladder which presses against 2 and causes 2 to deform.

6 is the inside surface of the football bladder facing the pressurized air.

7 is the inside surface of the cover-liner.

8 is the outside surface of the cover-liner which is the outside of the football.

1, 2, and 3 lie between the inside surface of the football's cover-liner 7 and the outside surface of the football bladder 5. 5 presses against 2.

The inductance L1 and capacitance C1 in the pressure transducer device circuit form a tank circuit. The tank circuit resonates at a resonant frequency f when the inductive reactance and the capacitive reactance of the circuit are equal. This occurs when $$f = \tfrac{1}{2}\pi \times 1/\text{SQUAREROOT}(L1\,C1)\ \text{HZ}$$

The resonant frequency "f" is a function of C1. As the pressure "P" increases, the value of C1 increases causing a decrease in the resonant frequency "f".

Now since C1 is a function of the bladder pressure "P", then "f" is also a function of the bladder pressure "P". As in FIG. 12A and FIG. 12B we now can construct a table relating the values of "f" to the values of "P" by calibrating the resonant frequency "f" in terms of the bladder pressure "P". Therefore, whenever we measure a value "f" as the resonant frequency of the tank circuit, we know the pressure "P" that caused it. Therefore we have indirectly derived a value for the bladder pressure "P" by measuring the value of "f".

In summary, the pressure transducer device is comprised of an LC tank circuit. The LC tank circuit is comprised of a pressure transducer capacitor.

The pressure transducer capacitor is comprised of a dynamic pressure transducer capacitor plate. The dynamic pressure transducer capacitor plate is comprised of a non-magnetic electrically conducting material of finite dimensions. The dynamic pressure transducer capacitor plate is deformable under pressure, and hence changes the capacitance value of the pressure transducer capacitor. The value of the capacitance of the pressure transducer capacitor is a known mathematical function of the bladder pressure based on knowledge of the construction of the pressure transducer capacitor.

The pressure transducer capacitor is further comprised of a flat wound inductor winding. The flat wound inductor winding is comprised of a multitude of spiral wound turns of conductive material. The flat wound inductor winding simultaneously acts as both an inductor and a static capacitor plate. The flat wound inductor winding also serves to electrically couple the electrical oscillations of the tank circuit to the pressure readout device using the thickness of the cover-liner as a spacer medium for enabling the pressure readout device to read the resonant frequency of the tank circuit either by capacitive coupling or by inductive coupling. The dynamic pressure transducer capacitor plate is made of a non-magnetic material to allow the magnetic flux from the flat wound inductor winding to pass through the dynamic pressure transducer capacitor plate unimpeded without interfering with the inductive coupling and with the operation of the inductive winding.

The resonant frequency of the pressure transducer device is a known mathematical function of the bladder pressure based on the construction of the pressure transducer capacitor.

The flat wound inductor winding is also comprised of a thin insulator substrate of finite thickness for providing a mechanical mounting surface for supporting the flat spiral wound inductive winding.

In a preferred embodiment, the dynamic pressure transducer capacitor plate and the flat wound inductor winding are disposed substantially parallel to one another and separated by a finite spacing which is a function of the football's pressure. Therefore, changes in the spacing brought about by changes in pressure, cause a change in the value of the capacitance of the pressure transducer capacitor; thereby causing a change in the resonant frequency of the LC tank circuit.

The LC tank circuit is configured in the form of a thin sheet having finite dimensions and is disposed inside the football and sandwiched between the bladder and the cover-liner. The tank circuit being a thin sheet enables it to snugly fit in the space between the bladder and the cover-liner.

FIG. 14

Figure 14:
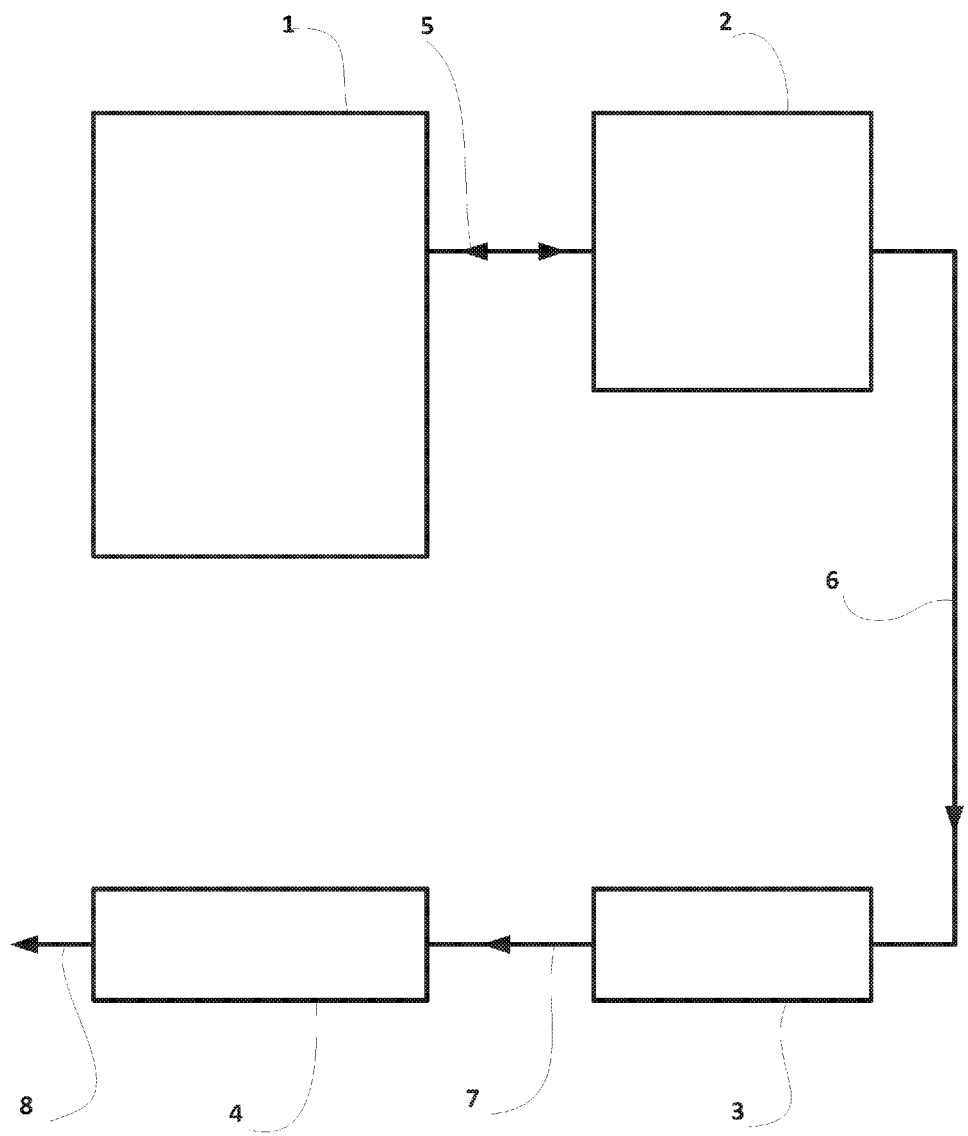
FIG. 14 is an electrical block diagram of a pressure transducer device being stimulated and read by an RF Network Analyzer using capacitive or inductive or electromagnetic coupling between the pressure transducer device and the RF Network Analyzer.

FIG. 14 is an electrical block diagram of a pressure transducer device being stimulated and read by an RF Network Analyzer using capacitive or inductive or electro-magnetic coupling between the pressure transducer device and the RF Network Analyzer.

The detailed physical elements disclosed in the drawing shown in FIG. 13A and FIG. 13B are identified as follows:

1 is the pressure transducer device. 1 is implanted in the football between the bladder and the cover-liner. 1 may be any of the preferred embodiments of the pressure transducers shown in FIG. 8, FIG. 11, FIG. 12A and FIG. 12B, FIG. 13A and FIG. 13B.

2 is a RF Network Analyzer. The RF (Radio Frequency) Network Analyzer is comprised of a digitally sweepable frequency generator and a frequency spectrum analyzer. 2 is external to the football's cover-liner. Signals between 2 and 1 pass through the football's cover-liner. 2 is wirelessly bi-directionally coupled to 1 via 5. 2 wirelessly stimulates 1 to oscillate at its resonant frequency (the resonant frequency of 1). The resonant frequency of 1 is a function of the football's bladder pressure. The resonant frequency signal from 1 is wirelessly coupled to 2 via 5. 2 wirelessly listens to 1 via 5 for the resonant frequency of 1. 2 develops a received signal strength indication i.e. RSSI that identifies the resonant frequency of 1.

The digitally sweepable frequency generator is configured for generating a continuous band of electrical frequencies, and for coupling the electrical frequencies into the pressure transducer device for stimulating the pressure transducer device to electrically oscillate at its resonant frequency.

The frequency spectrum analyzer is also configured for electrically coupling to the pressure transducer device and for scanning the frequency band of the pressure transducer device's electrical oscillations for determining the value of the resonant frequency of the pressure transducer device.

3 is a CPU (Computer Processing Unit includes memory). 3 runs applications software. 3 interprets the RSSI (received signal strength indication) packet it receives from 2 via 6 into a value for the football's pressure. The RSSI corresponds to the pressure of 1. 3 converts the RSSI from the frequency of 1 to pressure in psi. 3 displays the football pressure in psi. 3 is driven by 2 via 6.

The CPU is configured for receiving the value of the resonant frequency of the pressure transducer device from the frequency spectrum analyzer and for constructing and storing an algorithm in memory; and for calculating the value of the football's pressure from the resonant frequency using the algorithm; and configured for communicating the value of the football's pressure to the transceiver device. The algorithm is known from the configuration of the pressure transducer device as a mathematical function between the resonant frequency and the pressure.

4 is a pressure readout display calibrated in psi, and a transceiver. The transceiver is for encoding the football's ID and local time with the football's pressure; and for transmitting the football's ID and local time with the football's pressure from the pressure readout display to remote receivers; and for receiving control commands from the remote receivers for regulating the flow of the data.

The pressure readout display is configured for receiving the value of the football's pressure from the CPU and for displaying the value of the football's pressure.

5 is a bidirectional communications link. The signal from 2 to 1 via 5 is a swept band of frequencies generated by 2 which are inputted to 1. These frequencies stimulate 1 to oscillate at its resonant frequency. 2 listens to 1 via 5 for the resonant frequency of 1. 5 capacitively or inductively or electromagnetically couples 1 and 2. The bidirectional signals in 5 travel through the cover-liner of the football.

6 is a bidirectional communications link.

7 is a unidirectional communications link.

8 is a unidirectional communications link to remote receivers (not shown), wherein the remote receivers display the football's pressure to the game officials and the spectators.

In summary, in a preferred embodiment, the pressure readout device is comprised of a first inductive winding of finite length and diameter and number of turns made from electrically conductive material and serving as the secondary winding of an LF-VHF air core transformer. The first inductive winding is for inductively coupling the pressure readout device to the pressure transducer device to electrically wirelessly stimulate the pressure transducer device to electrically oscillate at its resonant frequency.

The first inductive winding is also for inductively coupling the electrical oscillations of the pressure transducer device to the pressure readout device to wirelessly facilitate the measurement of the value of the resonant frequency of the pressure transducer device by the pressure readout device.

Figure 15A:
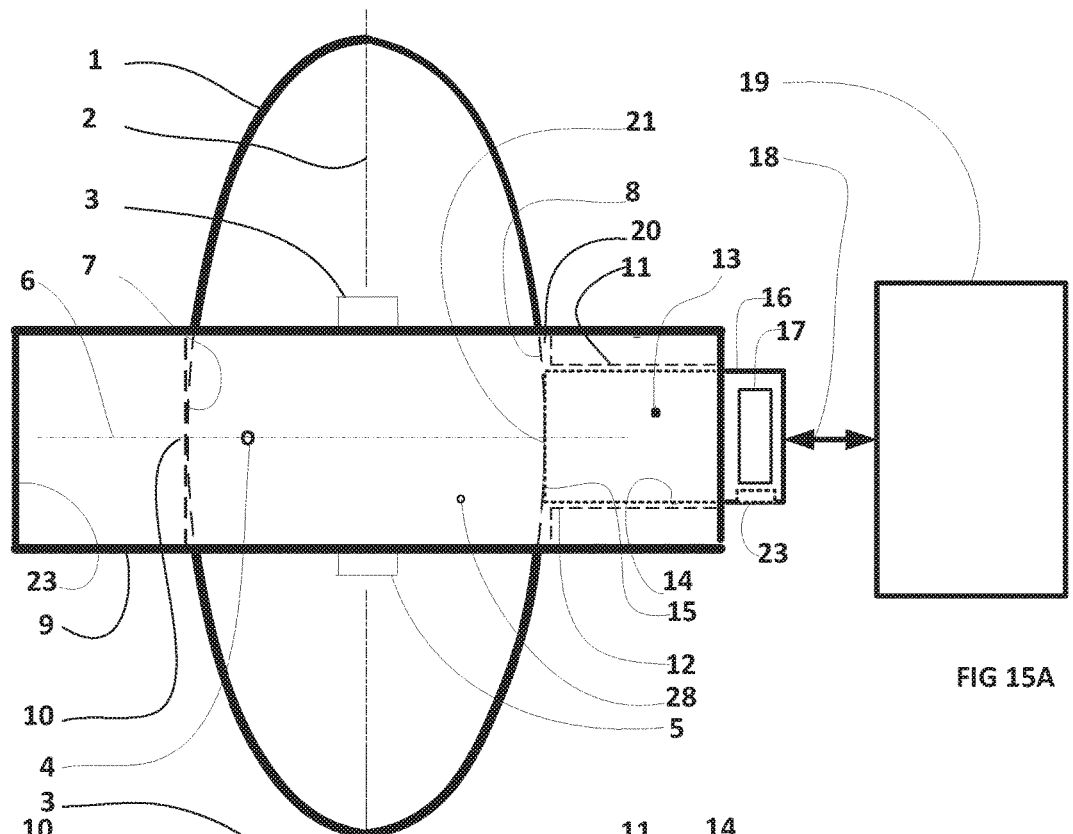
FIG. 15A and FIG. 15B shows a diagram of a side view and an end view respectively of a pressure transducer device and a pressure readout device mounted in a test stand. The pressure readout device is comprised of a Durometer.
Figure 15B:
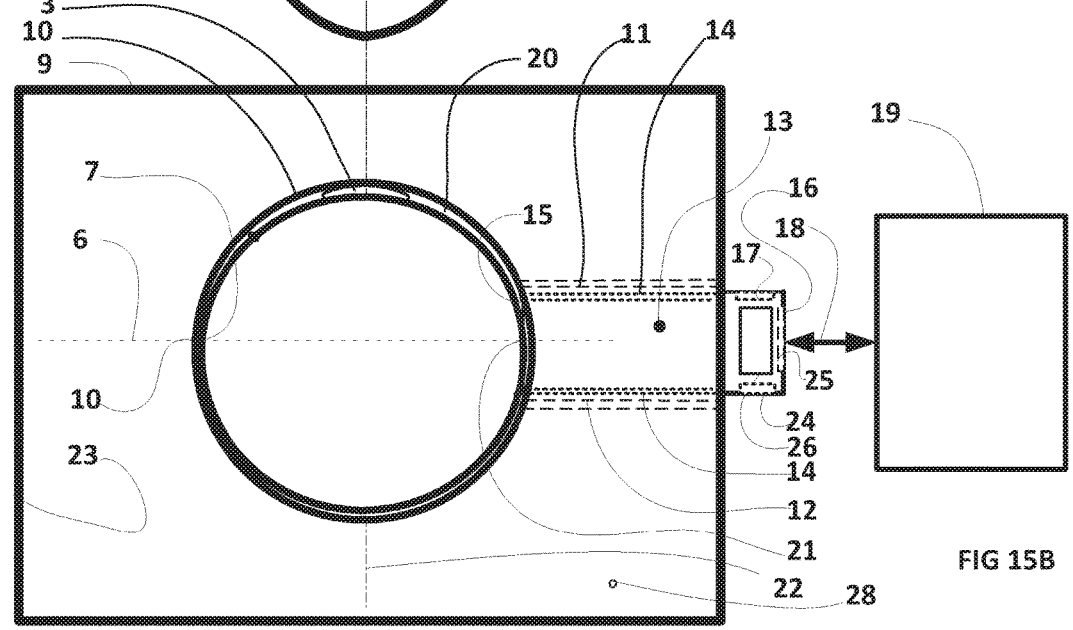

FIG. 15A and FIG. 15B

FIG. 15A and FIG. 15B shows a diagram of a side view and an end view respectively of a pressure transducer device and a pressure readout device mounted in a test stand. The pressure transducer device is comprised of a Durometer.

FIG. 15A and FIG. 15B show a preferred embodiment wherein the football's pressure is measured by physical contact with a Durometer. The Durometer is an instrument that measures the football's pressure by physically pressing on the football to achieve a pre-determined amount of compressive strain. The Durometer applies a force F perpendicular to the cover-liner of the football over an area A. The direction of the applied force is normal to the long z-axis of the football. The pressure is equal to F/A pounds per square inch. The Durometer measures the football's pressure, under a pre-determined compressive strain of the cover-liner, due to the pressure applied by the Durometer.

In a preferred embodiment the Durometer is a digital Durometer.

The football's pressure is the pressure applied by the digital Durometer to the football that causes the football to be compressed by the pre-determined compressive strain imposed by the digital Durometer.

The detailed physical elements disclosed in the drawing shown in FIG. 15A and FIG. 15B are identified as follows: FIG. 15A is a side view. FIG. 15B is an end view.

1 is the football whose pressure is being tested, and is the surface of the football's cover-liner.

2 is the long axis of the football i.e. the z-axis.

3 is the football laces.

4 is the football gas valve.

5 is the football laces.

6 is the x-axis of the football. 6 is orthogonal to 2 and 22.

7 is the surface of the football cover-liner.

8 is the surface of the football cover-liner shown within the cylindrical bore 10.

9 is the football test stand or support or pressure frame. The test stand 9 is used to mount and align the football 1. The test stand 9 is also used to mount the digital Durometer 13 that measures the pressure of the football under test. The test stand 9 holds the football stably while the football's pressure is being measured by the digital Durometer 13. 9 encircles and physically captures the football 1 within its smooth cylindrical bore 10. 9 is made from a rigid material i.e. steel. 9 is made rigid so that its strain is negligible for the pressures being used. 10 acts like a bearing surface to mount the football 1 and align it to the threaded cylindrical bore 11 of the digital Durometer 13.

The test stand 9 is for rigidly mounting the football and the pressure transducer device and the pressure readout device; and for aligning and restraining the football and the pressure transducer device and the pressure readout device with respect to one another in order to facilitate the measurement of the football's pressure. The test stand 9 is made of a rigid material.

10 is the inside diameter of the smooth cylindrical bore of the test stand 9 for mounting the football. 10 acts like a bearing surface for the football 1. 10 enables 13 to apply pressure perpendicular to the surface of the football's cover-liver and normal to the football's long z-axis. As 13 applies pressure to 1, the airspace between 7 and 10 diminishes and 7 comes into contact with 10. Gravity assists in bringing 7 into contact with 10.

11 is the threaded cylindrical bore in the test stand 9 for mounting the digital Durometer 13. 11 acts like a threaded cylindrical bearing for the digital Durometer which itself is threaded to mesh with 11. 11 allows the digital Durometer to be advanced along 6 toward the football's cover-liner to put pressure on the football perpendicular to the surface of the football's cover-liner and normal to the football's long z-axis. The digital Durometer is advanced toward the football by turning the digital Durometer clockwise (right hand thread). Fine thread is used in 11 to permit the digital Durometer to be advanced in a precision manner by a fraction of the pitch of its thread. The digital Durometer can be retracted by turning it counter-clockwise. The digital Durometer can be locked in place using a locking mechanism (not shown) i.e. set-screw.

12 is the threaded cylindrical bore in the test stand 9 for mounting the digital Durometer 13. 12 is a redundant view of 11.

13 is a digital Durometer. 13 is for measuring the pressure of the football by direct physical contact with the football. The long axis of the football is the football's y-axis. The Durometer has five (5) digital readout displays. The Durometer has at least one computer interface data port i.e. RS232, USB etc. that is connected to 18. The readout displays and the computer interface port data are both calibrated in psi i.e. pounds per square inch. 17, 24, 25, 26 and 27 displays the football pressure in psi. The computer interface data port of the digital Durometer is connected to transceiver 19 via 18. The transceiver 19 is driven by 13 via 18. 13 communicates the football's pressure data to at least one transceiver 19. 13 has a threaded cylindrical barrel 14 shown inside the test stand's cylindrical bore 11. 13 is captured in the threaded bore 11. 9 holds 13 pressed against and in contact with the football's cover-liner surface at the point of contact 21. The digital Durometer has a flat contact area A at its end 15 where it makes contact with the football at 21. 13 measures the football's pressure at 21.

In a preferred embodiment, the Durometer typically has a mechanical plunger having a pre-determined cross-sectional area configured for contacting and exerting a force on the football's cover-liner and a strain measurement device for measuring the strain of the football's cover-liner resulting from the force. A calculator is embodied in the Durometer for calculating the pressure exerted on the football.

14 is the threaded cylindrical barrel of the digital Durometer 13. There is a smooth fit between 14 and 11 allowing the digital Durometer to be advanced toward the football in a precision manner and be pressed against the football cover-liner at 21 and locked in place by a locking mechanism (not shown).

15 is the flat end of the digital Durometer which is pressed against the surface of the football's cover-liner at 21. The flat end of the digital Durometer has a contact area A.

16 is the end of the digital Durometer which is external to the cylindrical bore 11. This is the end of the Durometer that protrudes beyond 11 and contains the digital readout displays 17, 24, 25, 26 and 27.

17 is a digital readout display of the Durometer 13. 17 is used by the game officials to observe the pressure of the football under test.

18 Is the bi-directional communication link between the digital Durometer and the RF transceiver 19.

19 is a transceiver. 19 receives the football's pressure data from 13 via 18. 19 transmits the football's pressure data to remote receivers (not shown) where the game officials and the spectators view the football's pressure. The data transmitted involves the football's pressure and ID, the time and date, and the pressure readout device ID as well as any other information that the game officials deem as necessary. The football's ID, the time and date, and the pressure readout device ID can be entered into the transceiver either locally or remotely by the game officials and used to label the football's pressure.

Furthermore, 19 receives control commands from the game officials for regulating the flow of data from 19 to the game officials and the spectators. The transceiver encodes the football's ID, the pressure readout ID, date and local time with the football's pressure; and transmits the football's ID, the pressure readout ID, date and local time with the football's pressure from the pressure readout display to the game officials and spectators so they can continuously observe the data.

In one preferred embodiment, 19 is an RF transceiver. In another preferred embodiment, 19 is a fiber optics transceiver.

20 is an air space between the football's cover-liner and the cylindrical bore 10.

21 is the physical contact point (area) between the digital Durometer 13 and the football 1 being tested.

22 is the y-axis of the football 1. 22 is orthogonal to 2 and 6.

23 is the base or lower end of the stand 9. 23 is set up and arranged to be parallel to the ground so that the long axis i.e. the z-axis is parallel to the ground. The force of gravity tends to hold the football at 7 in contact with 10.

24 is a digital readout display of the Durometer 13. 24 is used by the game officials to observe the pressure of the football under test.

25 is a digital readout display of the Durometer 13. 25 is used by the game officials to observe the pressure of the football under test.

25 is on the very end surface 16 of the digital Durometer.

26 is a digital readout display of the Durometer 13. 26 is used by the game officials to observe the pressure of the football under test.

27 (not shown) is a digital readout display of the Durometer 13 around the back behind the view of FIG. 15B. 27 is used by the game officials to observe the pressure of the football under test.

28 is the body of the test stand. FIG. 15A and FIG. 15B show the pressure readout device 13 in its threaded bore in the upper end of 28.

The bearing surface 10 of the body of the test stand 28 has a cylindrical bore 10 for aligning the long axis of the football. The threaded bore 11 is for aligning the pressure readout device perpendicular to the cylindrical bore 10 and the surface of the cover-liner 7 of the football.

In another preferred embodiment, the test stand 28 is comprised of a set of two adjustable jaws. The jaws are comprised of two mating halves of the bearing surface 10 for holding the football and for centering the football. One of the two halves is configured with the threaded bore 11. The y-z plane divides the test stand body 28 into the two halves. 23 is on the lower half. The threaded bore and the Durometer are disposed on the upper half. Gravity assists in holding the football against 10 on the lower half. The jaws are driven to open and close by any generic mechanical device (not shown).

The digital Durometer has a total of five (5) readout displays i.e. 17, 24, 25, 26 and 27 all over its end 16 surfaces to enable the football's pressure to be read by game officials from any angle regardless of how its threaded cylindrical barrel is turned in 11.

In a preferred embodiment, 19 is an RF transceiver.

Operation Example:

Before the game begins, set up at least one football stand 9 on a flat level surface. The setup can be located on the sidelines or elsewhere.

Load each stand 9 with one of the football(s) whose pressure is to be tested.

For each stand 9, load the football 1 into 10 with the laces 3 facing approximately to the side 9 along 22. If the football is adjusted so that the laces are facing perfectly to the side 9 along 22, then the area A of the digital Durometer will fall in the football's seam between its panels; and we will be measuring the football's pressure at that seam. On the other hand, if the football is adjusted so that the laces are facing slightly off of the side 9, then the area A of the digital Durometer will fall on the football's panel; and we will be measuring the football's pressure at and on the panel. Either way can be selected depending on what the game officials specify is satisfactory.

Load the digital Durometer 13 into 9 by screwing the digital Durometer into 11. The digital Durometer readout displays will read zero (0) psi at this point in the procedure.

Screw the digital Durometer into 11 so that contact with the football's cover-liner is just made at 21. Initial contact can be assured when the digital readout display just begins to display a non-zero pressure reading.

Except for small misalignment errors between 1 and 10, gravity should initially bring the football 1 into contact with the test stand 9.

To overcome any small misalignment errors between 1 and 10, advance the digital Durometer 13 in 11 so that the football is pushed till the airspace between 7 and 10 becomes zero.

Now advance the digital Durometer 13 in 11 by a pre-determined number of turns (or fraction thereof) along 6 toward the football. The pre-determined number of turns (or fraction thereof) assures that the digital Durometer's full area "A" is in contact with the football's cover-liner and that the football is not excessively compressed by the Digital Durometer. This assures that the cover-liner is under a pre-determined amount of compressive strain.

The digital Durometer reading displayed on 17, 24, 25, 26 and 27 is calibrated to be the football's pressure in psi. Lock the digital Durometer 13 in place for as long as the football's pressure is to be monitored. The digital Durometer can be unlocked and retracted (by turning it counter-clockwise in 11) if the football is needed in the game and needs to be withdrawn from the stand 9.

The game officials have access to the footballs. The game officials may view the football's pressure directly on any of the digital Durometer's five (5) readout displays, or they can view the football's pressure remotely. The transceiver 19 transmits the football's pressure using to remote sites where the game officials and the spectators can both monitor the pressures of the footballs being tested. The footballs' pressures can be monitored simultaneously and continuously throughout the game if they remain in their test stands 9.

In summary:

1. The embodiment shown in FIG. 15A and FIG. 15B enables the game officials and spectators to simultaneously monitor the pressure of more than one football at a time.

2. The embodiment shown in FIG. 15A and FIG. 15B enables the game officials and spectators to monitor the football pressures at a multiplicity of sites remote to the football and its test stand.

3. The embodiment shown in FIG. 15A and FIG. 15B enables the football's pressure to be monitored without using the football's air valve.

4. The embodiment shown in FIG. 15A and FIG. 15B enables the football's pressure to be measured at multiple points on the football thereby providing for redundancy or backup in the event that some part of the system fails.

5. The embodiment shown in FIG. 15A and FIG. 15B is scalable to accommodate monitoring the pressures of a multiplicity of footballs simultaneously. Footballs under test can be assembled using a multiplicity of test stands arranged side by side; and their pressure readouts can be transmitted in parallel to remote sites for viewing by game officials and spectators alike.

In a preferred embodiment, the system is comprised of a pressure readout device mounted outside the football for measuring the value of the football's pressure. The pressure readout device also transmits the football's pressure data to at least one remote receiver where the data is observed by game officials and spectators.

The pressure readout device is comprised of a digital Durometer for measuring the value of the football's pressure. The Durometer presses on the cover-liner of the football with a plunger of known cross-sectional area, and compresses it by a predetermined distance. The Durometer measures the force it takes to compress the cover-liner by the predetermined distance and is configured with a CPU to divide the force by the value of the cross-sectional area to determine the pressure.

The system is also comprised of a transceiver device for receiving the value of the football's pressure from the Durometer. The transceiver device is configured for inputting the football's ID and time. The transceiver device is also configured for receiving the value of the football's pressure from the
pressure readout device. The transceiver device is also configured for encoding the football's ID and time and pressure data for transmitting the football's ID and time and pressure data to remote receivers to enable game spectators to view the data continuously. The transceiver device is also configured for receiving control commands from game officials for regulating the flow of the data.

The system is also comprised of a test stand made of a rigid material for rigidly mounting the football and the pressure readout device. The test stand is configured for aligning and restraining the football and the pressure readout device with respect to one another in order to stably facilitate the
measurement of the football's pressure.

The pressures can be monitored continuously by the game officials and by the spectators. The pressures of a plurality of footballs can be monitored simultaneously by the game officials and by the spectators. The pressures of a plurality of footballs can be monitored simultaneously by the game officials and by the spectators by using a plurality of test stands each loaded with a football designated for the game. The pressure can be determined continuously by keeping the Durometers operating continuously; and thereby enabling the readout displays to display the pressure to the game officials continuously. The transceivers will then continuously transmit the values of the pressures to the spectators continuously.

As shown, the test stand is comprised of a cylindrical bearing surface for holding the football. The cylindrical bearing surface makes contact with the cover-liner of the football for aligning the long axis of the football and for centering the football. A pressure readout device is mounted outside the surface of the cover-liner of the football and centered above the pressure transducer device that is inside the football. The test stand has a threaded bore for mounting the pressure readout device. The pressure readout device is itself threaded to facilitate its movement in the bore along its axis for making adjustable contact with the cover-liner. The threaded bore aligns the pressure readout device perpendicular to the cover-liner of the football.

In yet another preferred embodiment, the cylindrical bearing surface is divided into a set of two adjustable jaws (not shown). The two jaws are two mating halves that each has a half cylinder for holding the football and for centering the football. One of the two mating halves is configured with the threaded bore. For example, the y-z plane divides the body of the test stand into an upper and lower jaw. Adjustability is accomplished by any mechanism that varies the distance between the two jaws. There are a plethora of mechanisms available from the prior art.

Figure 16A:
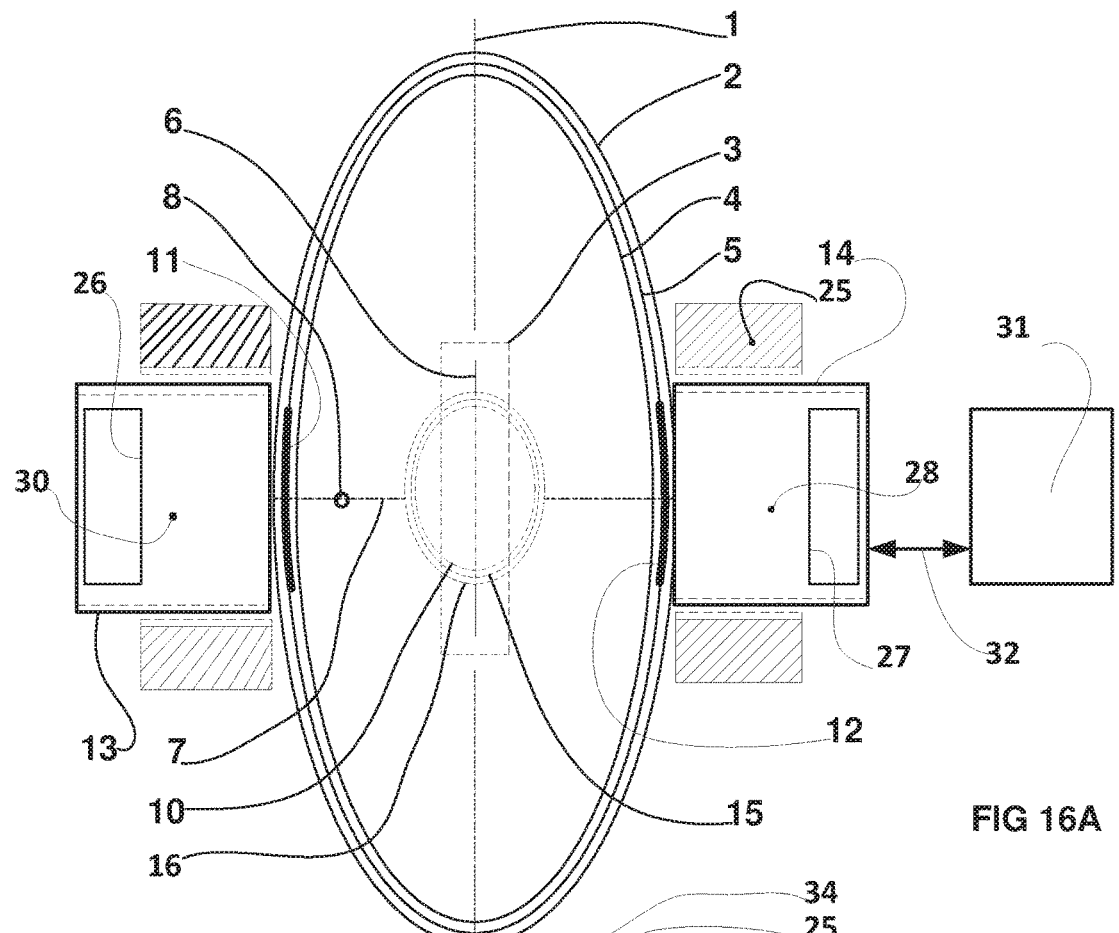
FIG. 16A shows the bottom view of a center section of an apparatus for measuring the bladder pressure of an instrumented football equipped (instrumented) using three pressure transducer devices with three pressure readout devices.
Figure 16B:
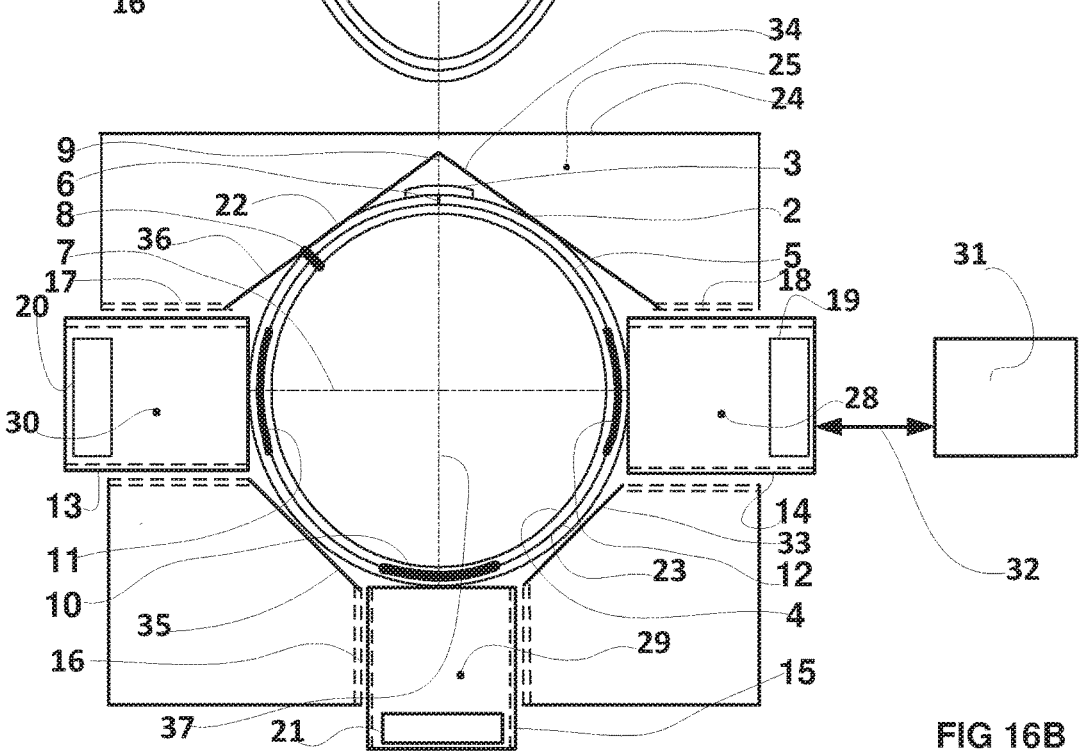
FIG. 16B shows an end view of a center section of an apparatus for measuring the bladder pressure of an instrumented football equipped (instrumented) using three pressure transducer devices with three pressure readout devices.

FIG. 16A and FIG. 16B

FIG. 16A shows the bottom view of a center section of an apparatus for measuring the bladder pressure of an instrumented football equipped (instrumented) using three pressure transducer devices with three pressure readout devices.

FIG. 16B shows an end view of a center section of an apparatus for measuring the bladder pressure of an instrumented football equipped (instrumented) using three pressure transducer devices with three pressure readout devices.

The detailed physical elements disclosed in the drawing shown in HG 10 are identified as follows:

1 is the y-axis of the football and the test stand.

2 is the outer surface of the cover-liner of the football in contact with the test stand.

3 are the laces of the football.

4 is the inside surface of the football bladder.

5 is the space (interface) between the outside surface of the football bladder and the inside surface of the football cover-liner.

6 is the slot opening through the football cover-liner.

7 is the x-axis of the football.

8 is the air valve of the football bladder.

9 is the z-axis of the football.

10 is the pressure transducer device situated in the space (interface) 5 between the outside surface of the football bladder and the inside surface of the football cover-liner. 10 is in the form of a thin sheet. The surface of 10 conforms to the shape of surface 5 as shown.

11 is the pressure transducer device situated in the space (interface) 5 between the outside surface of the football bladder and the inside surface of the football cover-liner. 11 is in the form of a thin sheet. The surface of 11 conforms to the shape of surface 5 as shown.

12 is the pressure transducer device situated in the space (interface) 5 between the outside surface of the football bladder and the inside surface of the football cover-liner. 12 is in the form of a thin sheet. The surface of 12 conforms to the shape of surface 5 as shown.

13 is a pressure readout device.

14 is a pressure readout device.

15 is a pressure readout device.

16 is a threaded bore of the test stand that meshes with the thread of 29.

17 is a threaded bore of the test stand that meshes with the thread 13 of 30.

18 is a threaded bore in the test stand that meshes with the thread 14 of 28.

The threaded bores enable the spacing between the digital readout devices and the surface of the cover-liner to be adjusted by turning the cylindrical barrel of the digital readout devices. In addition, the threaded bores align the digital readout devices and the pressure transducer devices together.

19 is a digital display of the football pressure.

20 is a digital display of the football pressure.

21 is a digital display of the football pressure.

22 is the outer surface of the cover-liner of the football in contact with the test stand.

23 is the outer surface of the cover-liner of the football in contact with the test stand's bearing surface 33.

24 is the bottom of the test stand. The test stand mounts and aligns the football and the three digital readout devices 13, 14 and 15.

25 is the body of the test stand. The test stand stably mounts and aligns the football and the three digital readout devices 13, 14 and 15.

The test stand is for rigidly mounting the football and the pressure transducer devices and the pressure readout devices; and for aligning and restraining the football and the pressure transducer devices and the pressure readout devices with respect to one another in order to facilitate the measurement of
the football's pressure. The game officials have access to the footballs continuously to monitor their pressures.

In a preferred embodiment, as shown, the test stand is comprised of four bearing surfaces for holding the football. The four bearing surfaces are flat and at right angles to one another. Each one makes tangential contact with the cover-liner of the football for aligning the long axis of the football and for centering the football. A pressure readout device is mounted outside the surface of the cover-liner of the football and centered above the pressure transducer device that is inside the football. The test stand has a threaded bore for mounting the pressure readout device. The pressure readout device is itself threaded to facilitate its movement in the bore along its axis for making adjustable contact with the cover-liner. The threaded bore aligns the pressure readout device perpendicular to the cover-liner of the football.

In yet another preferred embodiment, the four bearing surfaces are divided into a set of two adjustable jaws (not shown). The two jaws are two mating halves that have two perpendicular adjacent flat bearing surfaces each for holding and aligning the long axis of the football and for centering the football. For example, the y-z plane divides the body of the test stand into an upper and lower jaw. Adjustability is accomplished by any mechanism for varying the distance between the two jaws. One of the two mating halves is configured with the threaded bore. As in the previous preferred embodiment, the threaded bore is for mounting a pressure readout device. The pressure readout device is mounted outside the surface of the cover-liner of the football and centered above the pressure transducer device that is inside the football. The threaded bore is for aligning the pressure readout device perpendicular to the cover-liner of the football.

26 is a digital display of 30 showing the football pressure.

27 is a digital display of 28 showing the football pressure.

28 is a digital readout device mounted in the threaded bore 18 of the test stand 25.

29 is a digital readout device mounted in the threaded bore 16 of the test stand 25.

30 is a digital readout device mounted in the threaded bore 17 of the test stand 25.

31 is a transceiver. 19 receives the football's pressure data from 28 via 32. 31 transmits the football's pressure data to remote receivers (not shown) where the game officials and the spectators view the football's pressure. The transceiver is for encoding the football's ID, the pressure readout ID, date and local time with the football's pressure; and for transmitting the football's ID, the pressure readout ID, date and local time with the football's pressure from the pressure readout display to remote receivers; and for receiving control commands from the remote receivers for regulating the flow of the data
as well as any other information that the game officials deem as necessary.

It should be understood that 31 is a typical type of transceiver that also will support 30 as well as 29 but are not shown on the drawing because of space limitations on the drawing page.

32 is a bidirectional data communications link. Furthermore, 31 receives control commands from the remote receivers for regulating the flow of data from 31 to the remote receivers. In one preferred embodiment, 31 is an RF transceiver. In another preferred embodiment, 31 is a fiber optics transceiver.

33 is a bearing surface of the test stand for mounting the football with its long y-axis 1 perpendicular to the threaded bores 16, 17 and 18 of the pressure readout devices 28, 29, and 30, and with the threaded bores centered on the pressure transducer device 10, 11 and 12.

34 is a bearing surface of the test stand for mounting the football with its long y-axis 1 perpendicular to the threaded bores 16, 17 and 18 of the pressure readout devices 28, 29, and 30, and with the threaded bores centered on the pressure transducer device 10, 11 and 12.

35 is a bearing surface of the test stand for mounting the football with its long y-axis 1 perpendicular to the threaded bores 16, 17 and 18 of the pressure readout devices 28, 29, and 30, and with the threaded bores centered on the pressure transducer device 10, 11 and 12.

36 is one of four bearing surfaces of the test stand for mounting the football with its long y-axis 1 perpendicular to the threaded bores 16, 17 and 18 of the pressure readout devices 28, 29, and 30, and with the threaded bores centered on the pressure transducer device 10, 11 and 12.

37 is the y-axis of the football and the test stand.

FIG. 16A and FIG. 16B is a preferred embodiment showing an example of how pressure readout devices can be mounted in a test stand to monitor the pressure of a football implanted with pressure transducer devices. The apparatus shown in this embodiment is scalable to accommodate a multiplicity of footballs. Footballs under test can be assembled in their test stands side by side, and their pressure readouts can be transmitted to remote sites for viewing by game officials and spectators alike.

The three (3) digital readout devices 28, 29, and 30 have cylindrical barrels.

Each of the three digital readout devices has five (5) digital displays.

Four of the digital displays are arranged at ninety degree intervals around the barrel of each digital readout device. In addition, there is a digital display on the end of each digital readout device (not shown).

The digital displays are arranged so that the football pressure can be read off at least one of them from where the game official is located.

In a preferred embodiment, the three pressure readout devices 28, 29 and 30 are for reading out the bladder pressure of the instrumented football 2 equipped (instrumented) with three pressure transducer devices 10, 11 and 12. The pressure readout devices and the pressure transducer devices are referred to in FIG. 8 and in FIG. 11. The three pressure readout devices 28, 29 and 30 act to readout bladder pressure independently of one another. The three pressure readout devices are identical to one another. 30 reads 11. 28 reads 12. 29 reads 10. 30 is wirelessly coupled to 11. 28 is wirelessly coupled to 12. 29 is wirelessly coupled to 10.

The three pressure readout devices 28, 29 and 30 are positioned with a small finite air space separation between themselves and 2 so as not to put external pressure on 2. Putting external pressure on 2 could translate to an increase in bladder pressure and thereby cause inaccuracies in the bladder pressure readings which should be avoided.

Pressure readout device 28 wirelessly reads and displays the bladder pressure sensed by pressure transducer device 12. Pressure readout device 29 wirelessly reads and displays the bladder pressure sensed by pressure transducer device 10. Pressure readout device 30 wirelessly reads and displays the bladder pressure sensed by pressure transducer device 11.

Pressure readout devices 28, 29 and 30 are mounted externally to the outside surface of the cover-liner 2 of the instrumented football.

Pressure readout device 28 is mounted facing pressure transducer device 12.

Pressure readout device 29 is mounted facing pressure transducer device 10.

Pressure readout device 30 is mounted facing pressure transducer device 11.

In this embodiment the pressure transducer devices which are implanted inside the footballs do not measure the football's pressure directly. The transducers, in combination with their circuitry, provide a resonant frequency which is dependent on the football's pressure. That resonant frequency is read and transformed by an algorithm into the football's pressure expressed in psi. The algorithm is known from the configuration of the pressure transducer device as a mathematical function between the resonant frequency and the pressure.

The embodiment shown in FIG. 16A and FIG. 16B enables the game officials and spectators to simultaneously monitor the football's pressure both before and during the games, for example while the footballs are on the sidelines waiting to go into play.

In summary:

1. The embodiment shown in FIG. 16A and FIG. 16B enables the game officials and spectators to simultaneously monitor the pressure of more than one football at a time.

2. The embodiment shown in FIG. 16A and FIG. 16B enables the game officials and spectators to monitor the football pressures at a multiplicity of sites remote to the football and its test stand.

3. The embodiment shown in FIG. 16A and FIG. 16B enables the football's pressure to be measured without using the football's air valve.

4. The embodiment shown in FIG. 16A and FIG. 16B enables the football's pressure to be measured at multiple points on the football thereby providing for redundancy or backup in the event that some part of the system fails.

5. The embodiment shown in FIG. 16A and FIG. 16B is scalable to accommodate measuring the pressures of a multiplicity of footballs simultaneously. Footballs under test can be assembled using a multiplicity of test stands arranged side by side; and their pressure readouts can be read locally on the readout display by game officials and transmitted in parallel to remote sites for viewing by spectators.

The pressures of a plurality of footballs can be monitored simultaneously by the game officials and by the spectators alike by using a plurality of test stands each loaded with a football designated for the game. By keeping the stimulus on continuously, the pressure transducer devices will oscillate continuously; thereby enabling the pressure readout devices to determine the pressure continuously; and thereby enabling the readout displays to display the pressure to the game officials continuously. The transceivers will then continuously transmit the pressures to the spectators continuously.

FIG. 17

Figure 17:
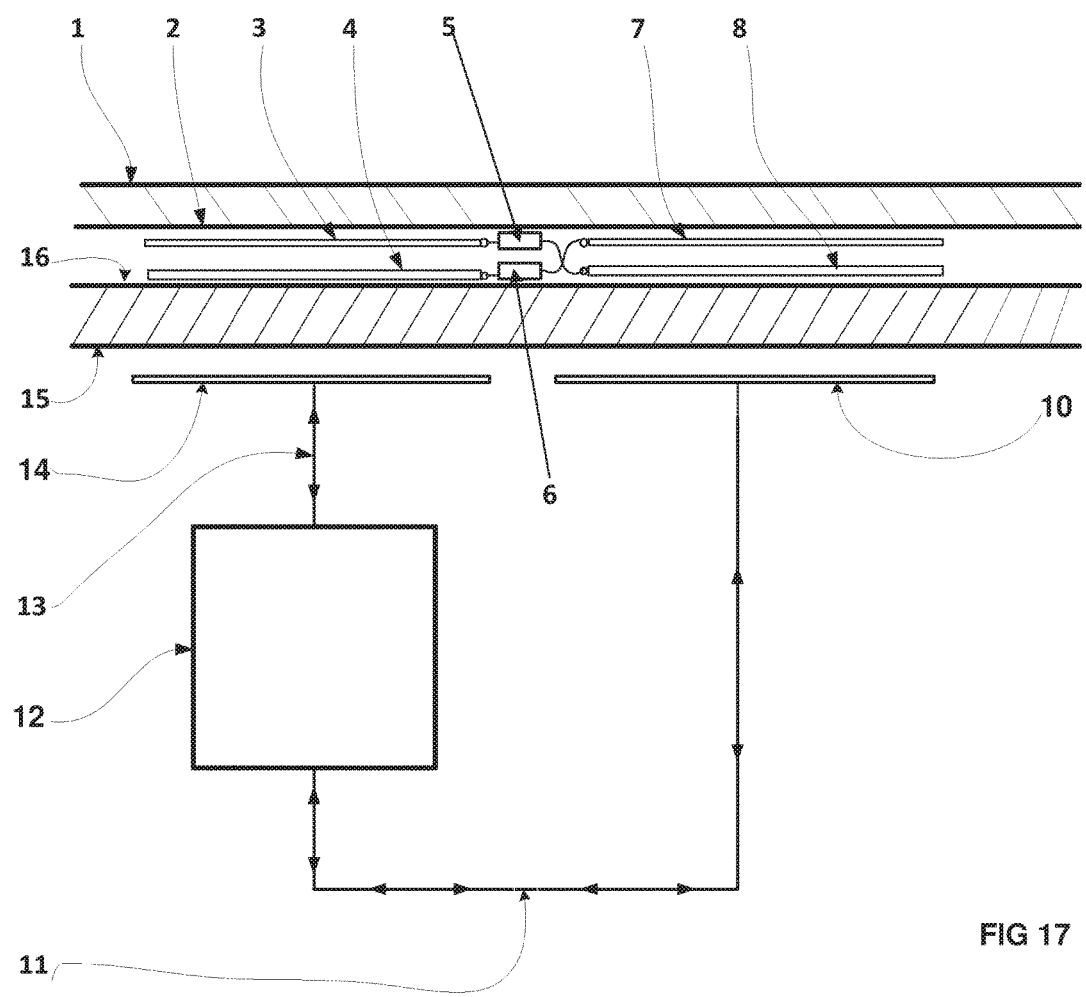
FIG. 17 shows a schematic electronics diagram of a pressure transducer device and a pressure readout device wherein the pressure transducer device is comprised of two serially connected pressure transducer capacitors capacitively coupled to the pressure readout device.

FIG. 17 shows a schematic electronics diagram of a pressure transducer device and a pressure readout device wherein the pressure transducer device is comprised of two serially connected pressure transducer capacitors capacitively coupled to the pressure readout device.

The detailed physical elements disclosed in the drawing shown in FIG. 17 are identified as follows:

1 and 2 are the inside and outside surfaces of the football bladder respectively.

2 is the outside surface of the football bladder pressing against the two pressure transducer capacitor plates 3 and 7. 1 is the inside surface of the football bladder facing the interior of the football bladder

3 and 4 are the plates of the first pressure transducer capacitor whose capacitance value is C2. The units of capacitance are Farads. 3 is pressed upon by 2. 4 is pressed upon by 16. Both 3 and 4 are conductive plates. 3 and 4 are spaced and parallel to each other. The value C2 changes with football pressure.

5 is a first inductor L1. The value of the inductor is L1 expressed in Henries.

6 is a second inductor L2. The value of the inductor is L2 expressed in Henries.

7 and 8 are the plates of the second pressure transducer capacitor whose capacitance value is C1. 7 is a pressure transducer plate, 7 is pressed upon by 2. Both 7 and 8 are conductive plates. 8 is pressed upon by 16. The value C1 changes with football pressure "P".

8 is a plate of capacitor C1. Pressure "P" is exerted on 8 by the football cover liner surface 16.

9 (not shown).

FIG. 17 represents a preferred embodiment of the present invention.

The pressure transducer device is comprised of two pressure transducer capacitors whose capacities are C1 and C2, and two inductors 5 and 6 whose inductances are L1 and L2 respectively. The pressure transducer device is in the form of a compliant thin sheet of finite thickness. The pressure transducer device can be easily slipped between the football bladder and the football cover-liner. The pressure transducer device conforms to the shape of the space between the football bladder and the football cover-liner. The pressure transducer devices are of very low mass compared to the mass of the football laces.

The pressure transducer device is capacitively coupled to the pressure readout device. 4 is capacitively coupled to 14 across the football cover-liner which acts as a dielectric spacer between 4 and 14. 8 is capacitively coupled to 17 across the football cover-liner which acts as a dielectric spacer between 8 and 17.

3, 4, 7, 8 are captured snugly in the space parallel to 2 and 16 when the football bladder is inflated.

The pressure readout device circuitry is comprised of two conducting plates 10 and 14. In the lower frequency ranges, 10 is capacitively coupled to 8, and 14 is capacitively coupled to 4. In the higher frequency ranges, 10 is electromagnetically coupled to 8 and 14 is electromagnetically coupled to 4, because in this frequency range 10 and 14 act as antennas.

11 is hardwiring connecting 9 to 12.

10 and 14 are positioned with a very small finite air space separation with 15 so as not to put undue external pressure on 15. Putting any significant external pressure on 15 could translate to an increase in bladder pressure and thereby cause inaccuracies in the bladder pressure readings.

12 is comprised of a digitally sweepable (variable) frequency generator, a frequency spectrum analyzer, a pressure readout display, and a transceiver. The pressure readout device circuitry is comprised of 10, 11, 12, 13 and 14. The pressure readout display is calibrated in psi (pounds per square inch) and displays the pressure of the football bladder. The pressure readout device circuitry is contained in an enclosure. The enclosure is not shown to reduce clutter if the figure. The transceiver is for encoding the football's ID, the pressure readout ID, date and local time with the football's pressure; and for transmitting the football's ID, the pressure readout ID, date and local time with the football's pressure from the pressure readout display to remote receivers; and for receiving control commands from the remote receivers for regulating the flow of the data.

13 is hardwiring connecting 12 and 14.

The pressure transducer device circuit is comprised of two capacitively coupled pressure transducer capacitors C1 and C2. C1 and C2 can be disposed next to one another in the space between the football cover liner and the football bladder. C1 has two plates 7 and 8. C2 has two plates 3 and 4. Since C1 and C2 are duplicates of one another, the capacitance values of C1 and C2 are theoretically equal to one another.

The pressure transducer device is also comprised of an inductive element 6. 6 is hardwired across plates 4 and 7. 6 has an inductance equal to L2.

The pressure transducer device is also comprised of an inductive element 5. 5 is hardwired across plates 8 and 3. 5 has an inductance equal to L1.

5 is connected in series with capacitors C1 and C2. 6 is connected in series with capacitors C1 and C2.

3, 4, 5, 6, 7 and 8 are sandwiched between the inflated football bladder and the cover-liner. The football bladder has an inside surface 1 containing pressurized air. The football bladder has an outside surface 2 normally pressing against the inside surface 16 of the football's cover-liner except where the pressure transducer devices are present.

15 and 16 are the outside and inside surfaces of the football cover-liner respectively. The cover-liner acts as a dielectric between plates 4 and 14 thereby enabling 4 to be capacitively coupled to 14. The cover-liner acts as a dielectric medium between plates 8 and 10 thereby enabling 8 to be capacitively coupled to 10. Therefore, 12 is capacitively coupled to 4 and 8 via 14 and 10.

This capacitive coupling enables 12 to excite the pressure transducer device's tank circuit comprised of L1 and L2 in series with C1 and C2. This capacitive coupling also enables 12 to listen for the resonant frequency of the tank circuit with its spectrum analyzer. The readout frequency of the spectrum analyzer is calibrated in psi. The spectrum analyzer scans the band which includes the resonant frequency of the tank circuit.

In a preferred embodiment, the pressure readout device is located externally to the instrumented football's cover-liner's outside surface 15. The pressure readout device's envelop (not shown) which contains 10 and 14 is positioned at the surface 15 of the cover-liner directly over the location of the pressure transducer device.

The physical separation between 15 and 16 is the thickness of the cover-liner.

The pressure readout device and the pressure transducer device are wirelessly capacitively coupled to one another. The pressure transducer capacitors C1 and C2 operate in series with one another yielding an effective capacitance of C3 which is equal to the product of C1 and C2 divided by the sum of C1 and C2.

C3 and L1 and L2 act in series with one another forming a tank circuit. The tank circuit has a resonant frequency "f". For a large value of L1 and L2 and C3 the resonant frequency is in the KHz range. For a small value of L1 and L2 and C3 the resonant frequency is in the MHz and GHZ range.

In the KHz range for example, 10 and 14 act as capacitor plates which are capacitively coupled to 4 and 8 respectively by electric fields. In the MHz and GHZ range, 10 and 14 act as antennas which are electromagnetically coupled to 4 and 8 respectively by electromagnetic fields.

The pressure readout device circuitry comprises a sweep frequency generator. The sweep frequency generator drives the tank circuit to electrically oscillate. When the frequency of the sweep frequency generator is equal to the resonant frequency "f" of the tank circuit, the tank circuit will resonate at frequency "f".

The value of the equivalent pressure transducer capacitor C3 is driven by the football bladder's pressure. High football bladder pressures cause the value of C3 to go high. Low football bladder pressures cause the value of C3 to go low. High football bladder pressure causes the tank circuit to resonate in the low frequency range. Low football bladder pressure causes the tank circuit to resonate in the high frequency range.

The frequency generator drives 10 and 14 to equal and opposite potentials. In order for the frequency generator to drive the tank circuit, 4 and 8 must be driven to equal and opposite potentials. In order to accomplish this, 3 is wired in series with 6, and 6 is wired in series with 8; and 4 is wired in series with 5, and 5 is wired in series with 7. This hardwiring configuration is unique. This hardwiring configuration not only allows 4 and 8 to operate at opposite potentials thereby permitting the frequency generator and the spectrum analyzer to be capacitively coupled to the tank circuit, but also allows C1 and C2 to operate in series with one another.

In a preferred embodiment, the pressure transducer device is comprised of two capacitive pressure transducers C1 and C2 and two inductors 5 and 6. The capacitive pressure transducers C1 and C2 have capacitance values that vary directly with the applied pressure from the inflated football bladder. The inductors 5 and 6 have fixed values of inductance.

The pressure transducer device containing C1 and C2 and L1 and L2 is inserted and sandwiched between the outside surface 2 of the football bladder and the inside surface 16 of the football cover-liner. As the bladder is inflated, 2 presses on 3 and 7, and 16 presses on 4 and 8. The pressure transducer device adds negligible mass to the football compared to the mass of the football's conventional laces. The mass of the conventional football's laces asymmetrically loads the conventional football across the y-axis, thereby bringing the center of gravity of the conventional football slightly away from the y-axis and closer to the laces.

In a preferred embodiment, the pressure transducer device takes the form of a thin sheet (sheath) of finite thickness. Being capacitively coupled to 12 via 10 and 14, the pressure transducer device is stimulated (excited) to oscillate without the need for its own battery. The pressure transducer device receives its electrical energy from 12 by being capacitively coupled to 12 via 10 and 14.

A battery is undesirable because it adds mass to the instrumented football which can change the instrumented football's handling and playability compared to the conventional football. Perceptible changes to the handling and playability of the conventional football are likely to be unacceptable to the NFL and the players.

The resonant frequency "f" of the pressure transducer device's tank circuit depends on the effective capacitance C3 and on the inductance L3 i.e. (L1+L2). Resonance occurs when the pressure transducer device tank circuit is driven at the frequency "f" by the frequency generator. This resonance at "f" occurs providing that the capacitive coupling between 12 and the pressure transducer device's tank circuit is loose so as not to make the resonant frequency of the reactive load on 12 be a different resonant frequency than that of just the tank circuit.

12 is configured to continuously scan across the frequency band containing the resonant frequency. The resonant frequency is dependent on the bladder pressure when the frequency measurement is made by the spectrum analyzer.

The National Football League requires that the bladder pressure of the footballs measured before games be within the pressure limits of 12.5 and 13.5 psi. This pressure range gives rise to a possible band of resonant frequencies caused by changes in C3 with pressure. The spectrum analyzer scans across and beyond both sides of this band to locate the resonant frequency.

When the circuits inside 12 detect that the frequency of the spectrum analyzer is equal to the resonant frequency of the tank circuit, i.e. where the frequency of the spectrum analyzer matches the resonant frequency of the tank circuit, the readout then displays the bladder pressure in psi. The bladder pressure is calibrated to the frequency value of the spectrum analyzer. If the bladder pressure is read out to be between 12.5 and 13.5 psi, the football bladder pressure is judged to be within acceptable pressure limits and the football can be used in the game. If the bladder pressure is read out to be outside the 12.5 to 13.5 psi pressure range, the football bladder pressure is judged to be unacceptable and the football cannot be used in the game. Of course the football can always be re-pressurized and brought within the 12.5 and 13.5 psi range. It is not clear at this time whether the existing NFL rules permit the re-pressurized football to be re-certified and brought back into the game; or even whether there needs to be a waiting period to assure that the football is physically able to hold its pressure.

The pressure readout device circuitry of 12 serves five purposes. First, it stimulates (excites) the pressure transducer device circuitry to oscillate. Second, it reads the resonant frequency of oscillation of the pressure transducer device. Third, it calibrates the resonant frequency to football bladder pressure by converting the resonant frequency of oscillation to psi pressure units. Fourth, it displays the football bladder pressure. Fifth, it encodes and transmits the football bladder pressure to remote receivers for game officials and spectators to observe. In a preferred embodiment, the pressure readout device circuitry is comprised of the following elements: a sweep frequency generator; an spectrum analyzer; a capacitive coupling plate 14; a capacitive coupling plate 10; a transceiver; and a display.

The following is a description of the circuit interconnectivity between the pressure transducer device and the pressure readout device. The sweep frequency generator and the spectrum analyzer within 12 are hardwired to plate 14. Plate 14 is capacitively coupled to plate 4 through the football cover-liner which acts as the dielectric filling the space between the plates.

Plate 8 is hardwired in series to inductor 5. Inductor 5 has an inductance L1. Inductor 5 is hardwired in series to plate 3.

Plate 7 is hardwired in series to inductor 6. Inductor 6 has an inductance L2. Inductor 6 is hardwired in series to plate 4.

Plate 8 is capacitively coupled to plate 10 through the football cover-liner which acts as the dielectric medium filling the space between the plates. Plate 10 is hardwired to the digitally sweepable (variable) frequency generator within 12.

Plate 7 and plate 8 make up the first pressure transducer variable capacitor C1. Plate 3 and plate 4 make up the second pressure transducer variable capacitor C2.

The inductors 5 and 6 and capacitors C1 and C2 in the pressure transducer device circuit form a tank circuit. The tank circuit resonates at a resonant frequency "f" when the inductive reactance and the capacitive reactance of the circuit are equal. This occurs when $$f = \frac{1}{2\pi} \times 1/\text{SQUAREROOT}((L1+L2)(C1C2)/(C1+C2)) \text{ HZ}$$

Note that the right hand and left hand parts of the drawing can be separated to form two separate and distinct pressure transducers and pressure readout devices thereby permitting the pressure transducers and their readouts to operate at different locations inside the cover-liner of the instrumented football.

Now since C1 and C2 are functions of the bladder pressure "P", then "f" is also a function of the bladder pressure "P". We now can construct a table relating the values of "f" to the values of "P" by calibrating the resonant frequency "f" in terms of the bladder pressure "P", Therefore, whenever we measure a value "f" as the resonant frequency of the tank circuit, we know the pressure "P" that caused it. Therefore we have indirectly derived a value for the bladder pressure "P" by measuring the value of "f".

In summary, the preferred embodiment is a system comprised of a battery-less pressure transducer device and a pressure readout device. The pressure transducer device is carried internally by the football for sensing the football pressure. The pressure transducer device oscillates electrically at a resonant frequency, which is a mathematical function of the football's pressure, when the pressure transducer device is wirelessly stimulated (excited) to oscillate by the pressure readout device. The pressure readout device reads the frequencies of electrical oscillation of the pressure transducer device by being electrically coupled to the pressure transducer device. The frequency spectrum analyzer is configured for electrically coupling to the pressure transducer device and is configured for scanning the frequency band of the pressure transducer device's electrical oscillations for determining the value of the resonant frequency of the pressure transducer device. The pressure readout device reads the pressure transducer device's resonant frequency of oscillation and uses an algorithm to transform the resonant frequency to bladder pressure. The algorithm is derived from the known mathematical functional relationship between the resonant frequency and the pressure. The algorithm is known from the configuration of the pressure transducer device as a mathematical function between the resonant frequency and the pressure.

The pressure readout device then communicates the pressure to remote sites for game officials and spectators to observe.

The pressure transducer device is sandwiched between the football's bladder and the football's cover-liner. The form of the pressure transducer device is a sheet of finite thickness facing the bladder. The form of the pressure transducer device is compliant with the contour of the space between the bladder and the cover-liner. The pressure transducer device oscillates electrically at a resonant frequency which is a function of the bladder pressure when the pressure transducer device is stimulated (excited) to oscillate.

The pressure transducer device is comprised of an LC tank circuit.

The LC tank circuit is comprised of a first pressure transducer capacitor and
a second pressure transducer capacitor and two inductors i.e. a first inductor and a second inductor.

The first pressure transducer capacitor and the second pressure transducer capacitor and the first inductor and the second inductor are wired in series with one another. The capacitance of the first pressure transducer capacitor is a function of the bladder pressure. The capacitance of the second pressure transducer capacitor is a function of the bladder pressure. The two inductors have finite fixed values.

The first pressure transducer capacitor is comprised of a first dynamic conductive plate facing the bladder and disposed substantially parallel to said bladder and a first static conductive plate facing the cover-liner and disposed substantially parallel to the cover-liner. The first static conductive plate of the first pressure transducer capacitor is capacitively coupled to the first conductive plate of the pressure readout device using the thickness of the cover-liner as a dielectric spacer medium.

The second pressure transducer capacitor is comprised of a second dynamic conductive plate facing the bladder and disposed substantially parallel to the bladder and a second static conductive plate facing the cover-liner and disposed substantially parallel to the cover-liner. The second static conductive plate of the second pressure transducer capacitor is capacitively coupled to the second conductive plate of the pressure readout device using the thickness of the cover-liner as a dielectric spacer medium.

The first dynamic conductive plate and the first static conductive plate are disposed substantially parallel to one another and separated by a finite distance. The first dynamic conductive plate deforms under pressure thereby changing the average distance between the plates. The distance and therefore the capacitance of the first pressure transducer capacitor is a function of bladder pressure.

The second dynamic conductive plate and the second static conductive plate are disposed substantially parallel to one another and separated by a finite distance. The second dynamic conductive plate deforms under pressure thereby changing the average distance between the plates. The distance and therefore the capacitance of the second pressure transducer capacitor is a function of bladder pressure.

The first static conductive plate of the first pressure transducer capacitor is wired to the second dynamic conductive plate of the second pressure transducer capacitor via the series first inductor. The second static conductive plate of the second pressure transducer capacitor is wired to the first dynamic conductive plate of the first pressure transducer capacitor via the series second inductor.

The pressure readout device is comprised of a first conductive plate for capacitively coupling the pressure readout device to the first static conductive plate of the first pressure transducer capacitor and a second conductive plate for capacitively coupling the pressure readout device to the second static conductive plate of the second pressure transducer capacitor and a digitally sweepable frequency generator for exciting the tank circuit to oscillate at its resonant frequency and a frequency spectrum analyzer for scanning the band which includes the resonant frequency of the tank circuit and a pressure readout display for displaying the pressure and a transceiver for communicating the pressure to remote sites.

The first static conductive plate of the first pressure transducer capacitor is capacitively coupled to the first conductive plate of the pressure readout device using the cover-liner as a dielectric spacer medium.

The second static conductive plate of the second pressure transducer capacitor is capacitively coupled to the second conductive plate of the pressure readout device using the cover-liner as a dielectric spacer medium.

The first pressure transducer capacitor is capacitively coupled to the first conductive plate of the pressure readout device and the second pressure transducer capacitor is capacitively coupled to the second conductive plate of the pressure readout device.

The pressure readout device is for wirelessly stimulating the pressure
transducer device to oscillate at its resonant frequency. The value
of the resonant frequency of oscillation of the pressure transducer device
is a function of the bladder pressure bearing down on the pressure
transducer device. This functional relationship is used to derive an algorithm.

The algorithm is known from the configuration of the pressure transducer device as a mathematical function between the resonant frequency and the pressure.

The pressure readout device is positioned externally to the football and in contact with the outside surface of the cover-liner and centered above the sandwiched pressure transducer device. The pressure readout device is electrically wirelessly coupled to the pressure transducer device. The pressure readout device is wirelessly coupled to the pressure transducer device to provide electrical power to the pressure transducer device.

In a preferred embodiment, the pressure readout device is inductively coupled to the pressure transducer device.

In another preferred embodiment, the pressure readout device is capacitively coupled to the pressure transducer device.

In yet another preferred embodiment, the pressure readout device is electromagnetically coupled to the pressure transducer device.

The pressure readout device wirelessly measures the resonant frequency of oscillation of the pressure transducer device; and by an algorithm transforms the resonant frequency of oscillation to the value of the bladder's pressure. The algorithm is derived from the mathematical functional relationship between pressure and frequency. The algorithm is known from the configuration of the pressure transducer device as a mathematical function between the resonant frequency and the pressure.

The pressure readout device is configured with at least one digital display for viewing the value of the bladder's pressure.

The pressure readout device is further configured with a transceiver. The transceiver is for transmitting the value of the bladder's pressure to remote sites for viewing by game officials and spectators. The pressures can be monitored continuously by the game officials and by the spectators. The pressures of a plurality of footballs can be monitored simultaneously by the game officials and by the spectators. The pressures of a plurality of footballs can be monitored simultaneously by the game officials and by the spectators by using a plurality of test stands each loaded with a football designated to be used for the game. By keeping the stimulus on continuously, the pressure transducer device will oscillate continuously; thereby enabling the pressure readout device to determine the pressure continuously; and thereby enabling the readout display to display the pressure to the game officials continuously. The transceiver will then continuously transmit the pressure to the spectators continuously.

We claim:

1. A system for measuring the air pressure of a prior art conventional American-style football comprising a bladder and a cover-liner, comprising:
   a test stand made of rigid material and having a bearing surface configured for rigidly mounting, aligning, and restraining a football;
   a pressure transducer device rigidly mounted and aligned in said test stand adjacent to said bearing surface, comprising
   a mechanical plunger having a pre-determined cross-sectional area configured for continuously contacting and exerting pressure on a football's cover-liner and for receiving equal and opposite pressure from a football's cover-liner to continuously sense a value of a football's pressure, and
   a CPU with software configured for calculating the value of the football's pressure;
   a pressure readout device mounted in said test stand and configured for receiving the value of a football's pressure from said pressure transducer device, comprising
   a pressure readout display configured for continuously displaying the value of a football's pressure received from said pressure transducer device, and
   at least one transceiver device configured for continuously receiving the value of the football's pressure from said CPU as well as receiving a football's ID, a time and date, wherein the transceiver device continuously transmits the value of the football's pressure, ID, time and date to remote receivers where game officials and spectators may continuously monitor a football's pressure.

2. Said system of claim 1 wherein said test stand is further comprised of:
   said bearing surface having a smooth cylindrical bore for mounting and aligning the cover-liner of the football to said test stand, and
   a threaded cylindrical bore for mounting and aligning said pressure transducer device and for adjusting said pressure transducer device pressure perpendicular to the cover-liner of the football mounted in said smooth cylindrical bore.

3. Said system of claim 1 wherein said pressure transducer device is a digital Durometer wherein said digital Durometer is configured with a threaded cylindrical barrel for adjusting the pressure of said digital Durometer on the cover-liner of the football.

4. Said transceiver device of claim 1 wherein said transceiver device is further configured for receiving control commands from game officials for regulating the flow of data to the spectators.

5. A method for measuring the air pressure of a prior art conventional American-style football in real time wherein the football is comprised of a bladder and a cover-liner, comprising:
   a. rigidly mounting and aligning and restraining the football in a test stand made of rigid material by gripping the surface of its cover-liner,
   b. pressing on the surface of the cover-liner with a pressure transducer device deployed outside the football adjacent to said bearing surface and rigidly mounted and aligned on said test stand, wherein said test stand comprises a mechanical plunger having a pre-determined cross-sectional area configured for continuously contacting and exerting pressure on a football's cover-liner and for receiving equal and opposite pressure from a football's cover-liner to continuously sense a value of a football's pressure and a CPU with software configured for calculating the value of a football's pressure,
   c. displaying the value of the air pressure of the football on a pressure readout device mounted in said test stand and configured for receiving the value of a football's pressure from said pressure transducer device, comprising
   a pressure readout display configured for continuously displaying the value of a football's pressure received from said pressure transducer device, and
   wherein at least one transceiver device configured for continuously receiving the value of the football's pressure from said CPU as well as receiving a football's ID, time and date,
   wherein the transceiver device continuously transmits the value of the football's pressure, ID, time and date to remote receivers where game officials and spectators may continuously monitor a football's pressure.

6. The method of claim 5, wherein said pressure transducer device is a digital Durometer.

* * * * *